US012706734B2

(12) United States Patent
Robinson et al.

(10) Patent No.: US 12,706,734 B2
(45) Date of Patent: Aug. 11, 2026

(54) AUTOMORPHIC TRANSFORMATIONS OF SIGNAL SAMPLES WITHIN A TRANSMITTER OR RECEIVER

(71) Applicant: Rampart Communications, Inc., Linthicum, MD (US)

(72) Inventors: Matthew Brandon Robinson, Millersville, MD (US); Andrew Keith Palmisano, Columbia, MD (US)

(73) Assignee: Rampart Communications, Inc., Linthicum Heights, MD (US)

( * ) Notice: Subject to any disclaimer, the term of this patent is extended or adjusted under 35 U.S.C. 154(b) by 176 days.

(21) Appl. No.: 18/808,174

(22) Filed: Aug. 19, 2024

(65) Prior Publication Data

US 2024/0413976 A1 Dec. 12, 2024

Related U.S. Application Data

(63) Continuation-in-part of application No. 18/432,879, filed on Feb. 5, 2024, now Pat. No. 12,206,761, and a continuation-in-part of application No. 18/187,630, filed on Mar. 21, 2023, said application No. 18/432,879 is a continuation of application No. 17/668,876, filed on Feb. 10, 2022, now Pat. No. 11,936,770, said application No. 18/187,630 is a continuation of application No. 16/916,303, filed on Jun. 30, 2020, now Pat. No. 11,641,269.

(60) Provisional application No. 63/147,919, filed on Feb. 10, 2021.

(51) Int. Cl.
*H04L 9/06* (2006.01)
*H04L 9/00* (2022.01)

(52) U.S. Cl.
CPC ............ *H04L 9/0668* (2013.01); *H04L 9/008* (2013.01)

(58) Field of Classification Search
CPC ..... H04L 9/0668; H04L 9/008; H04L 9/0618; H04L 9/0631
See application file for complete search history.

(56) References Cited

U.S. PATENT DOCUMENTS

| | | | |
|---|---|---|---|
| 11,310,030 | B2 | 4/2022 | De et al. |
| 2004/0101048 | A1 | 5/2004 | Paris |
| 2007/0097856 | A1 | 5/2007 | Wang et al. |

(Continued)

FOREIGN PATENT DOCUMENTS

| | | | |
|---|---|---|---|
| EP | 1133097 | A1 | 9/2001 |
| WO | 2022/173919 | A1 | 8/2022 |

OTHER PUBLICATIONS

Co-pending U.S. Appl. No. 17/956,742, inventor Robinson; Matthew Brandon, filed Sep. 29, 2022.

(Continued)

*Primary Examiner* — Vu V Tran

(57) ABSTRACT

A computing device encrypts data with a UBDM transformation by obtaining a sequence of data points and a cryptographic key, and grouping the sequence of data points into at least one data block of a predetermined length. The computing device transforms the data block by applying layers of transformation to generate at least one encrypted data block. Each layer includes a key application transformation based on the cryptographic key, an automorphism, and a permutation. The computing device provides the encrypted data block to a transmitter for transmission.

20 Claims, 13 Drawing Sheets

(56) References Cited

U.S. PATENT DOCUMENTS

| | | | |
|---|---|---|---|
| 2011/0060917 | A1 | 3/2011 | Troncoso et al. |
| 2013/0216044 | A1 | 8/2013 | Gentry et al. |
| 2015/0110269 | A1 | 4/2015 | Ohya et al. |
| 2018/0276014 | A1 | 9/2018 | Kliuchnikov et al. |
| 2018/0332147 | A1 | 11/2018 | Park et al. |
| 2021/0250075 | A1* | 8/2021 | Robinson ............. H04B 7/0634 |
| 2022/0255728 | A1 | 8/2022 | Robinson et al. |
| 2022/0382521 | A1 | 12/2022 | Krcmaricic-Barackov et al. |

OTHER PUBLICATIONS

International Preliminary Report on Patentability for International Application No. PCT/US2022/015938, dated Aug. 24, 2023, 8 pages.

International Search Report and Written Opinion for Application No. PCT/US2022/015938, dated May 17, 2022, 14 pages.

Non-Final Office Action for U.S. Appl. No. 17/668,876 dated Jun. 23, 2023, 14 pages.

Wahab, H. B. A., et al., "Using Unitary Matrices in High-speed Video Encryption", International Journal of Computer Science and Network Security (IJCSNS) (Jun. 1, 2015); 15(6): 92-95.

* cited by examiner

100

AUTOMORPHIC TRANSFORMATIONS OF SIGNAL SAMPLES WITHIN A TRANSMITTER OR RECEIVER

CROSS-REFERENCE TO RELATED APPLICATIONS

This application is a continuation-in-part of U.S. patent application Ser. No. 18/432,879, filed Feb. 5, 2024 and titled "Automorphic Transformations of Signal Samples Within a Transmitter or Receiver," which is a continuation of U.S. Pat. No. 11,936,770, filed Feb. 10, 2022 and titled "Automorphic Transformations of Signal Samples Within a Transmitter or Receiver," which in turn claims priority to and the benefit of U.S. Provisional Patent Application No. 63/147,919, filed Feb. 10, 2021 and titled "Automorphic Transformations of Signal Samples Within a Transmitter or Receiver," the contents of each of which are hereby incorporated by reference in their entirety for all purposes.

This application is a continuation-in part of U.S. patent application Ser. No. 18/187,630, filed Mar. 21, 2023 and titled "Modulation-Agnostic Transformations using Unitary Braid Divisional Multiplexing (UBDM)," which is a continuation of U.S. Pat. No. 11,641,269, filed on Jun. 30, 2020 and titled "Modulation-Agnostic Transformations using Unitary Braid Divisional Multiplexing (UBDM)," the disclosure of which is herein incorporated by reference in its entirety for all purposes.

FIELD

The present disclosure is related to data communications, and more specifically to techniques for enhancing security of data communications using Unitary Braid Division Multiplexing (UBDM).

BACKGROUND

Telecommunication involves the transmission of data within wired or wireless systems. Wireless communication involves the exchange of data between points within a communications channel using an electromagnetic wave, and without the use of an electrical conductor. A basic telecommunication system includes a transmitter, a transmission medium, and a receiver. Transmitters convert data into a signal. The transmission medium carries the signal to the receiver, which in turn converts the signal back into the data for a recipient.

Wireless communication systems are widely deployed to provide various types of communication services such as voice, packet data, and so on. These systems may utilize a modulation technique capable of providing high performance for some wireless environments, for example by partitioning the overall system bandwidth into a number of sub-bands (e.g., ($N_s$) orthogonal sub-bands), which are also commonly referred to as subcarriers, tones, bins, and frequency subchannels. In multiple access communications, multiple user devices transmit signals over a single communications channel to a receiver. These signals are superimposed, forming a combined signal that propagates over that channel. The receiver then performs a separation operation on the combined signal to recover one or more individual signals from the combined signal. For example, each user device may be a cell phone belonging to a different user and the receiver may be a cell tower. By separating signals transmitted by different user devices, the different user devices may share the same communications channel without interference.

A transmitter may transmit different symbols by varying a state of a carrier or subcarrier, such as by varying an amplitude, phase and/or frequency of the carrier. Each symbol may represent one or more bits. These symbols can each be mapped to a discrete value in the complex plane, thus producing Quadrature Amplitude Modulation (QAM), or by assigning each symbol to a discrete frequency, producing Frequency Shift Keying (FSK). The symbols are then sampled at the Nyquist rate, which is at least twice the symbol transmission rate. The resulting signal is converted to analog through a digital to analog converter, and then translated up to the carrier frequency for transmission. When different user devices send symbols at the same time over the communications channel, the sine waves represented by those symbols are superimposed to form a combined signal that is received at the receiver.

DETAILED DESCRIPTION

Overview

Figure 1:
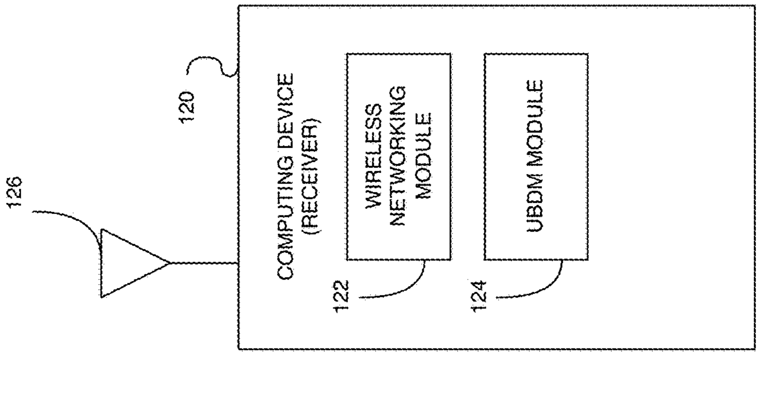
FIG. 1 is a block diagram of a wireless transmission system configured to secure wireless transmissions using a Unitary Braid Division Multiplexing (UBDM) transformation, according to an example embodiment.
Figure 1:
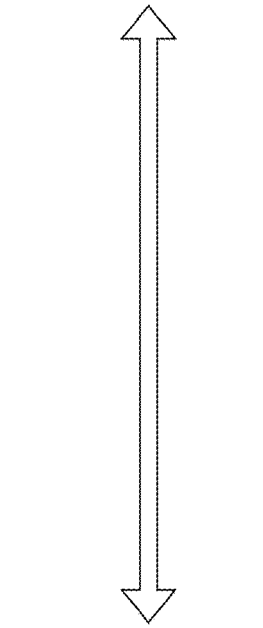
Figure 1:
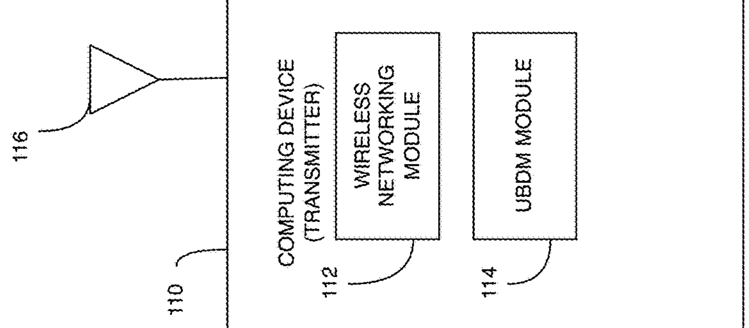

A computer-implemented method is provided for encrypting data with a UBDM transformation. The method includes obtaining a sequence of data points and a cryptographic key at a processor, and grouping the sequence of data points into at least one data block of a predetermined length. The method also includes transforming the at least one data block to generate at least one encrypted data block by applying a plurality of layers. Each layer among the plurality of layers includes a key application transformation based on the cryptographic key, an automorphism, and a permutation. The method further includes providing the at least one encrypted data block to a transmitter.

Description of Embodiments

When linear transformations are applied to data as part of an encoding (e.g., "pre-coding") or modulation process prior to transmission via a network, the transmitted data can be susceptible to deciphering by eavesdroppers who may be able to determine the linear transformations based on a small number of "plain/cipher" sets (e.g., pairs) and using, for example, a single matrix inversion. As such, systems and methods employing linear transformations can be improved by the non-linearization of pre-transmission data. Although known mechanisms exist for applying nonlinear operations on complex numbers in general, and notwithstanding the data security risks associated with linear transformations, the application of such mechanisms in the context of data modulation is not believed to have previously been successfully performed, for example because of the various constraints and considerations commonly associated with data modulation. For example, during modulation, the power of the signal being transmitted can be reduced, and noise and distortion can be amplified. Non-unitary and non-linear operations can amplify and distort signals, thereby increasing the Bit Error Rate (BER). Non-linear transformations are typically not isometric, and therefore also amplify noise and increase BER to undesirable levels. By contrast, unitary transformations preserve signal power and are isomorphic/isometric, and thus are used ubiquitously in signals without taking into account security considerations. Some known cryptologics include a non-linear component that can block a linear attack by an eavesdropper. Because such cryptologics operate on bits (i.e., bit-level security) rather than on symbols, however, noise is not of concern.

Techniques are provided herein for modifying complex baseband symbols in a nonlinear manner, to enhance security of wireless systems, such as Orthogonal Frequency-Division Multiplexing (OFDM) systems. In some embodiments, a method of encoding data includes identifying multiple complex number sets (e.g., pairs) of an input data vector and generating a transformed data vector by applying a non-linear transformation to each complex number set from the multiple complex number sets. A signal representing the transformed data vector is sent to one or more transmitters for transmission of a signal representing the transformed data vector from the one or more transmitters to one or more receivers. A signal representing the non-linear transformation may be sent to a second compute device for transmission of the non-linear transformation to the one or more receivers prior to transmission of the signal representing the transformed data vector from the one or more transmitters to the one or more receivers, for recovery of the data vector at the one or more receivers. For example, this may include a shared secret, shared key, shared counter information, state data, etc.

As used herein, a "transmitter" (or "signal transmitter") refers to any collection of components that are used in the transmission of signals, including any combination of, but limited to, one or more: antennas, amplifiers, cables, digital-to-analog converters, filters, up-converters, processors (e.g., for reading bits and/or mapping of bits to a baseband), etc. Similarly, as used herein, a "receiver" (or "signal receiver") refers to any collection of components that are used in receiving signals, including any combination of, but limited to, one or more: antennas, amplifiers, cables, analog-to-digital converters, filters, down-converters, processors, etc.

Some embodiments of the present disclosure include systems and methods that achieve non-linearization of pre-transmission data symbols as part of the modulation process, for establishing data privacy at the physical layer without amplifying noise. Non-linear transformations (or "transforms") set forth herein include non-linear transformations that do not amplify noise, or that introduce a minimal amount of amplification to noise. The non-linear transformation can be applied to input data (e.g., data vectors or symbols derived therefrom) once or several times, optionally interleaved with other transformations (linear or otherwise) any number of times.

In some known communication systems, received data samples are transformed based on values of the data samples themselves. For example, a transformation applied to a first sample may be based on a phase or a magnitude of a second sample. Such approaches, for example when implemented in the context of encryption, where the transformations may be nonlinear, can introduce errors. Embodiments of the present disclosure, by contrast, transform received data based on the output of a random number generator (RNG) or a pseudo-random number generator (PRNG), irrespective of the values of the received data samples themselves, as discussed below. Since the RNG and/or PRNG output is, itself, non-linear, the transformation applied to the received data can be linear, thereby avoiding the introduction of noise to the data.

Systems of the present disclosure, according to some embodiments, can include a random number generator (RNG), a pseudo-random number generator (PRNG), or any other source of random values and/or pseudo-random values. The random values and/or pseudo-random values can include binary values, real values, complex values, and/or values from any other mathematical ring or field. At least one automorphism (or "automorphic transformation") is generated, with each automorphism generated based on one of: the random values (i.e., the output of the RNG), the pseudo-random values (i.e., the output of the PRNG), or an external factor. Each automorphism may be linear, antilinear, or a combination thereof. The in automorphism may include multiple primitive transformations (e.g., automorphic transformations that operate on fewer data points than the original automorphism).

In some embodiments, incoming data (e.g., represented as real signal samples and/or complex signal samples, such as baseband I/Q) may be received (e.g., via a receiver) and partitioned into data blocks. Each data block may have a predefined size (e.g., a user-defined size or a processor-determined size) such that the data blocks are compatible with an automorphism. Each data block includes a subset of the incoming data. In some implementations, the data blocks do not include bits. The automorphism is generated based on one or more random values and/or pseudo-random values, and is applied to each of the data blocks in the context of (i.e., within) a signal transmitter or receiver.

As used herein, an automorphic transformation, or "automorphism," refers to an isomorphism from a data block to itself, where an isomorphism is a structure-preserving mapping between two structures of the same type that can be reversed by an inverse mapping. In the specific context of this application, automorphism refers to an invertible map from the space of blocks of signal samples, viewed as a point in a complex Hilbert space, to itself. Because such blocks will always be finite dimensionally, the automorphism can be viewed as an element of the general linear group acting on blocks of signal samples.

Referring now to FIG. 1, a simplified block diagram illustrates an example of a network system 100 configured to communicate information securely between computing devices. The network system 100 includes a computing device 110, which may be also be referred to herein as a transmitter device. The computing device 110 includes a wireless networking module 112 that enables the computing device 110 to process communications signals and exchange information with other computing devices over a wireless network. The computing device 110 also includes a Unitary Braid Division Multiplexing (UBDM) module 114 that enables the computing device 110 to encode and decode a constellation of predefined symbols (e.g., 16-QAM) wherein the encoded constellation has a Gaussian distribution (e.g., via a UBDM transformation). The computing device 110 may also include an antenna 116, which may include a plurality of discrete antennas (e.g., an antenna array) that enables the computing device 110 to transmit/receive wireless signals to/from other computing devices.

The network system 100 includes a computing device 120, which may be also be referred to herein as a receiver device. The computing device 120 includes a wireless networking module 122 that enables the computing device 120 to process communications signals and exchange information with other computing devices over a wireless network. The computing device 120 also includes a UBDM module 124 that enables the computing device 120 to encode and decode a constellation of predefined symbols (e.g., 16-QAM) wherein the encoded constellation has a Gaussian distribution (e.g., via a UBDM transformation). The computing device 120 may also include an antenna 126, which may include a plurality of discrete antennas (e.g., an antenna array) that enables the computing device 120 to transmit/receive wireless signals to/from other computing devices.

In one example, the computing device 110 and/or computing device 120 may be embodied in a laptop computer, a desktop computer, a server, a network device, an Internet of Things (IoT) device, a mobile phone, a radio, any other wireless device, or an accessory device to any of the preceding devices. The computing devices 110 and 120 may be integrated into larger computing systems, such as a data center or cloud computing environment.

In another example, the wireless networking module 112 and the wireless networking module 122 may further include a software defined radio that enables the computing device 110 and the computing device 120, respectively, to adjust the parameters (e.g., frequency, amplitude, power, timing, etc.) of the wireless signals transmitted via the antenna 116 and the antenna 126.

In a further example, the computing device 110 and the computing device 120 may communicate via a computer network, such as a Local Area Network (LAN), a Wide Area Network (WAN), a private network, a Virtual Private Network (VPN), a Metropolitan Area Network (MAN), a Personal Area Network (PAN), a Wireless LAN (WLAN), a Wireless WAN (WWAN), a cellular network, and/or combinations thereof. The computer network between the computing device 110 and the computing device 120 may include segments over wired and/or wireless channels, such as Radio Frequency (RF) channels, Extremely Low Frequency (ELF) channels, Ultra Low Frequency (ULF) channels, Low Frequency (LF) channels, Medium Frequency (MF) channels, High Frequency (HF) channels, Very High Frequency (VHF) channels, Ultra High Frequency (UHF) channels, Extremely High Frequency (EHF) channels, and/or satellite channels. The computer network between the computing device 110 and the computing device 120 may also include one or more segments over optical networks (e.g., based on Synchronous Optical Networking (SONET), Synchronous Digital Hierarchy (SDH), or Optical Transport Network (OTN) protocols).

Fast Unitary Transformations

Methods and systems described above usually involve a matrix operation on a vector. If the length of the vector is N and the size of the matrix is N×N (e.g., when the matrix is a unitary matrix), then the matrix operation on the vector involves $O(N^2)$ multiplications. Accordingly, as N increases, the computational burden on the telecommunication system can be prohibitive.

In some embodiments, some fast unitary transformations can be employed to reduce the calculation complexity. For example, the matrix operation on the vector can be achieved using a Fourier matrix, Walsh-Hadamard matrix, Haar matrix, Slant matrix, certain types of Toeplitz matrix, and certain types of circulant matrices that can be operated on a vector in a fast complexity class. These types of matrices, however, only form a limited class of transformations and therefore the resulting level of security may not be satisfactory.

To address the complexity issues while maintaining the security of the communication, systems and methods described herein employ an approach to build an arbitrary unitary matrix up from smaller matrices. In this approach, unitary matrices are built up in layers. Each layer includes two operations. The first operation is a permutation and the second operation is a direct sum of U(2) matrices. Permutation matrices are unitary matrices that do not require any floating-point operations and therefore are computationally free, i.e., with O(1) complexity. U(2) matrices are matrices where most of the values are 0, except the 2×2 blocks along the diagonal (also referred to as block-U(2) matrices). These block-U(2) matrices involve only 4×N/2=2×N multiplications. As a result, a layer including a block-U(2) involves 2×N multiplications for the block-U(2) and no multiplications for the permutation. In other words, one layer during construction of a unitary matrix has complexity O(N).

The total complexity of constructing a unitary matrix is the product of the number of layers and O(N) that is the complexity of each layer. In some embodiments, the total number of layers can be log(N), and the total complexity of all of the layers is therefore O(N×log(N)), which is equivalent to the complexity of a standard OFDM. In addition, log(N) layers of block-U(2) and permutation matrices can produce a dense unitary. While the space of fast unitary matrices is not as large as the full space of unitary matrices, it can still be sufficiently large to make an attack by an eavesdropper prohibitive (see more details below with reference to FIG. 9).

In some embodiments, the approach described herein can employ block-U(m) matrices to build unitary matrices, where m is a positive integer (e.g., m=3, 4, 5, etc.). In some embodiments, matrices having different sizes can also be used within a single layer when constructing a unitary matrix. In some embodiments, different layers can use matrices having different sizes, e.g., a first layer uses block-U(m) matrices and a second layer uses block-U(l) matrices, where m is different from l. For example, if N=8, a set of four 2×2 block-U(2) matrices can be used in the first layer, followed by a permutation. Then two U(3) matrices and a single U(2) matrix can be used in the second layer, followed by another permutation. The third layer can include a block-U(2) matrix, a block-U(4) matrix, and then another block-U(2) matrix, followed by a third permutation.

In some embodiments, certain types of fast unitary matrices can also be written in terms of layers, each of which includes a permutation and a direct sum of blocks of smaller matrices. These types of matrices include, for example, Fourier matrices, Walsh-Hadamard matrices, Haar matrices, Slant matrices, and Toeplitz matrices. In some embodiments, the unitary matrix that can be constructed using the layered approach includes any matrix that is not a direct sum of discrete Fourier matrices.

Security Issues with Linear Transformations in Modulation

To illustrate the security vulnerabilities associated with data modulation using linear transformations, suppose that Alice and Bob are only applying a linear unitary matrix A to a data symbol $\bar{b}$ to get $\bar{s}=A\bar{b}$ at the transmitter, and then applying $A^{\dagger}$ (i.e., the inverse of matrix A) to $\bar{s}$ at the receiver to get $A^{\dagger}\bar{s}=A^{\dagger}A\bar{b}=\bar{b}$. In this case, suppose that Eve is able to collect a set of N linearly independent values of $\bar{s}$, denoted $\bar{s}_1, \bar{s}_2, \ldots, \bar{s}_N$. If Eve knows the corresponding untransformed bauds $\bar{b}_1, \ldots, \bar{b}_N$, she can arrange the untransformed bauds into a matrix $B=(\bar{b}_1, \ldots, \bar{b}_N)$, and the transformed bauds into the corresponding matrix $S=(\bar{s}_1, \ldots, \bar{s}_N)$. The equation linking B and S is then $$S = AB \tag{1}$$

As such, and because the bauds are assumed to be linearly independent and A is assumed to be unitary, S will be full rank (i.e., all rows and columns are linearly independent), and Eve can readily invert it, getting $$A = SB^{\dagger} \tag{2}$$

This gives Eve the entire matrix A, and as such, the security of the data transmission has been breached.

Non-Linear Transformations in Modulation

The foregoing example illustrates the security vulnerability that can exist when a linear transformation used for data modulation. The following sections describe embodiments for non-linearizing transformations during data modulation to improve security of data transmissions while avoiding drawbacks that are typically associated with non-linear operations. For example, as discussed above, non-linear transformations can amplify and/or distort a signal, thereby amplifying the noise, decreasing signal-to-noise ratio (SNR), and/or increasing the Bit Error Rate (BER). Some embodiments set forth herein accomplish a disruption of the linearity (i.e., a non-linearization) without amplifying (or minimally amplifying) the noise, in a way that may allow the system designer to tune the degree of non-linearity. Non-linear transformations described herein may not increase the total power of the signal, and are invertible, and thus permit data recovery at a receiver. The non-linear transformations can be applied to input data (e.g., data vectors or symbols derived therefrom) once or several times, optionally interleaved with other transformations (linear or otherwise) any number of times, prior to transmission of the transformed. For example, there may be 5 layers of a "block U(2)" matrix with a non-linear transformation (as set forth herein) and a permutation.

Figure 2A:
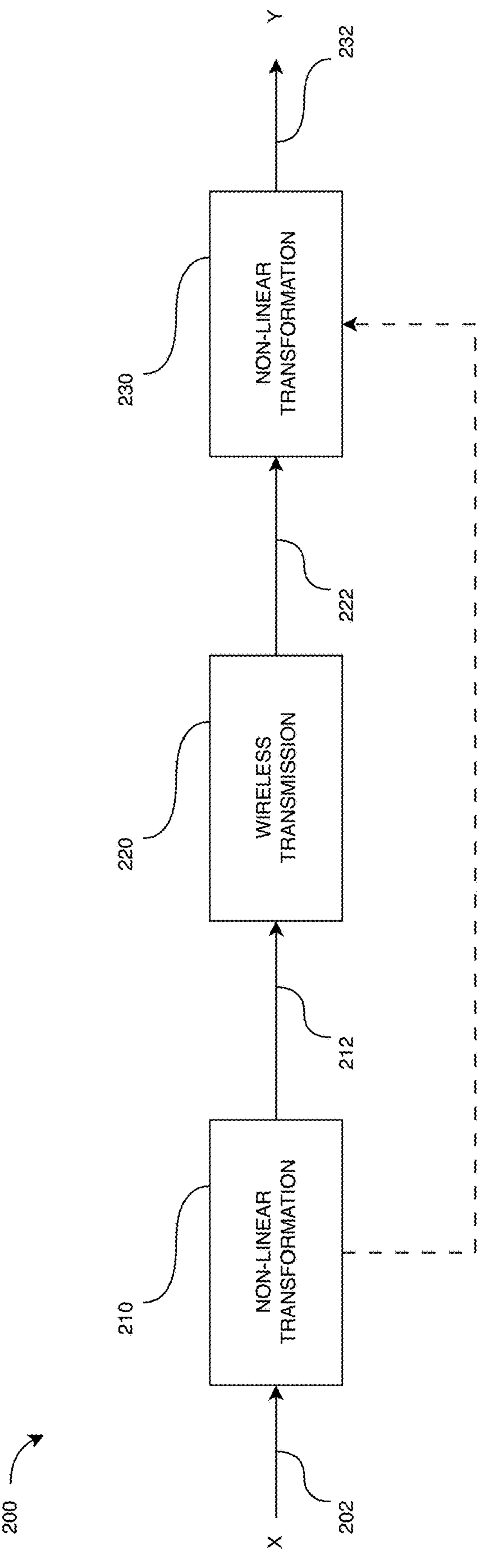
FIG. 2A is a block diagram illustrating a process flow for encoding and decoding a signal, according to an example embodiment.

FIG. 2A is a block diagram illustrating a process flow for encoding and decoding a signal using a non-linear transformation, according to an embodiment. During the encoding and decoding process 200, an input data vector "X" is input at 202 to a computing device. A non-linear transformation (which is, optionally, a norm-preserving transformation) is applied via the computing device at 210 to the input data vector X to produce a transformed vector. The transformed vector is sent, at 212, to one or more transmitters for wireless transmission 220. One or more signals representing the transformed vector is sent to one or more receivers at 222, and once received at the one or more receivers, the transformed vector is decoded/demodulated at 230 based on the non-linear transformation to reconstruct the input data vector at 232 (output "Y"). As indicated by the dashed line in FIG. 2A, a representation of the non-linear transformation may have been transmitted from the computing device to the one or more receivers (e.g., prior to, concurrently with, in parallel with, overlapping in time with, or after transmission of the one or more signals representing the transformed vector is sent to one or more receivers at 222).

In some embodiments, the non-linear transformation includes applying a first non-linear transformation and a second non-linear transformation prior to sending the signal representing the transformed data vector to the plurality of transmitters. The first and second non-linear transformations can be applied to a common collection or subset of complex number sets, or each can be applied to a different collection or subset of complex number sets. For an example of the latter case, suppose an input data vector has a length of 4, and includes components (i.e., complex numbers) 1, 2, 3, and 4. Now suppose that prior to the first non-linear transformation, components 1 and 2 are paired as one set, and components 3 and 4 are paired as another set. The first non-linear transformation is then applied to the (1,2) set and to the (3,4) set, for example in parallel or overlapping in time. Next, another collection of sets is identified, in which components 1 and 3 are paired as a first set, and components 2 and 4 are paired for the second set. The second non-linear transformation is then applied to the (1,3) set and to the (2,4) set, for example in parallel or overlapping in time. Note that, in some embodiments, although the first non-linear transformation can be applied to the (1,2) set and to the (3,4) set in parallel and the second non-linear transformation can be applied to the (1,3) set and to the (2,4) set in parallel, the first and second non-linear transformations are not performed in parallel, since the input to the second non-linear transformation is the output from the first nonlinear transformation.

Example Nonlinear Operations

In some embodiments, a nonlinear operation Q is applied q times in the first part of a fast transform. Each $Q_i$ has a length N vector associated with it, denoted $\bar{w}_i$, and there is a total of q such vectors. The values in $\bar{w}_i$ can be referred to as "activators" for the full nonlinear transform Q. Each component of $\bar{w}_i$ is a 2-bit value. As such, in all, there are 2N bits in each $\bar{w}_i$.

The action of $Q_i$ (which depends on $\bar{w}_i$) is pairwise, on adjacent values of $\bar{b}$ (e.g., components 1 and 2, then components 3 and 4, etc.). The action can be illustrated with reference to a single 2 component block. Q can include a modification of the second component of each doublet of the vector if and only if some condition on the values of $\bar{w}$ and $b_1$ are met, in a way that depends on what those values are. The following is example pseudo-code for the action of Q on a single doublet. The input is the two vector components $b_1$ and $b_2$ (which reside in the constellation C) and the two 2-bit values $w_1$ (with bits $w_{11}$ and $w_{12}$) and $w_2$ (with bits $w_{21}$ and $w_{22}$).

```
if w_11 == 0 then
  if (-1)^w12 == Sign (Re(b_1)) then
    if (w_21, w_22) == (0, 0) || (w_21, w_22) == (1, 1) then
      b_2 <- -b_2
    end if
    if (w_21, w_22) == (0, 1) then
      b_2 <- b_2*
    end if
    if (w_21, w_22) == (1, 0) then
      b_2 <- -b_2*
    end if
  end if
end if
if w_11 == 1 then
  if (-1)^w12 == Sign (Im(b_1)) then
    if ((w_21, w_22) == (0, 0) || (w_21, w_22) == (1, 1)) then
      b_2 <- -b_2
    end if
    if (w_21, w_22) == (0, 1) then
      b_2 <- b_2*
    end if
    if (w_21, w_22) == (1, 0) then
      b_2 <- -b_2*
    end if
  end if
end if
```

The function Sign(x) is a function that returns +1 when x>0 and −1 when x<0. As an example, consider a case in which $w_1$ and $w_2$ are (1; 0) and (1; 1), respectively, and $b_1=1+i$ and $b_2=-1+i$. Since $w_{11}=1$, the imaginary part of $b_1$ is considered. The sign of the imaginary part of $b_1$ is Sign $(\mathrm{Im}(b_1))=\mathrm{Sign}\ (\mathrm{Im}(1+i))=\mathrm{Sign}\ (+1)=+1$. The value $(-1)^{w12}=(-1)^0=+1$. As such, it is the case that $(-1)^{w12}==\mathrm{Sign}(\mathrm{Im}(b_1))$. Because $w_2=(1, 1)$, $b_2 \leftarrow -b_2$ and the action of Q on this doublet is:

$$\begin{pmatrix} 1+i \\ -1+i \end{pmatrix} \rightarrow \begin{pmatrix} 1+i \\ 1-i \end{pmatrix} \quad (3)$$

Note that the first (top) component is unchanged. The foregoing is performed for each doublet of the vector, and such operations collectively constitute a single application of Q. The permutations are included so that different components act as "control gates" for other components at each of the q layers. Note that the action of Q is unitary, though highly nonlinear.

In some embodiments, generating the transformed data vector also includes performing a linear transformation or a discrete Fourier transform after applying the non-linear transformation. Alternatively, or in addition, the one or more receivers that receive the one or more signals representing the transformed vector includes a plurality of antenna arrays, and the receiver(s) and the transmitter(s) can be configured to perform Multiple Input Multiple Output (MIMO) operations.

Figure 2B:
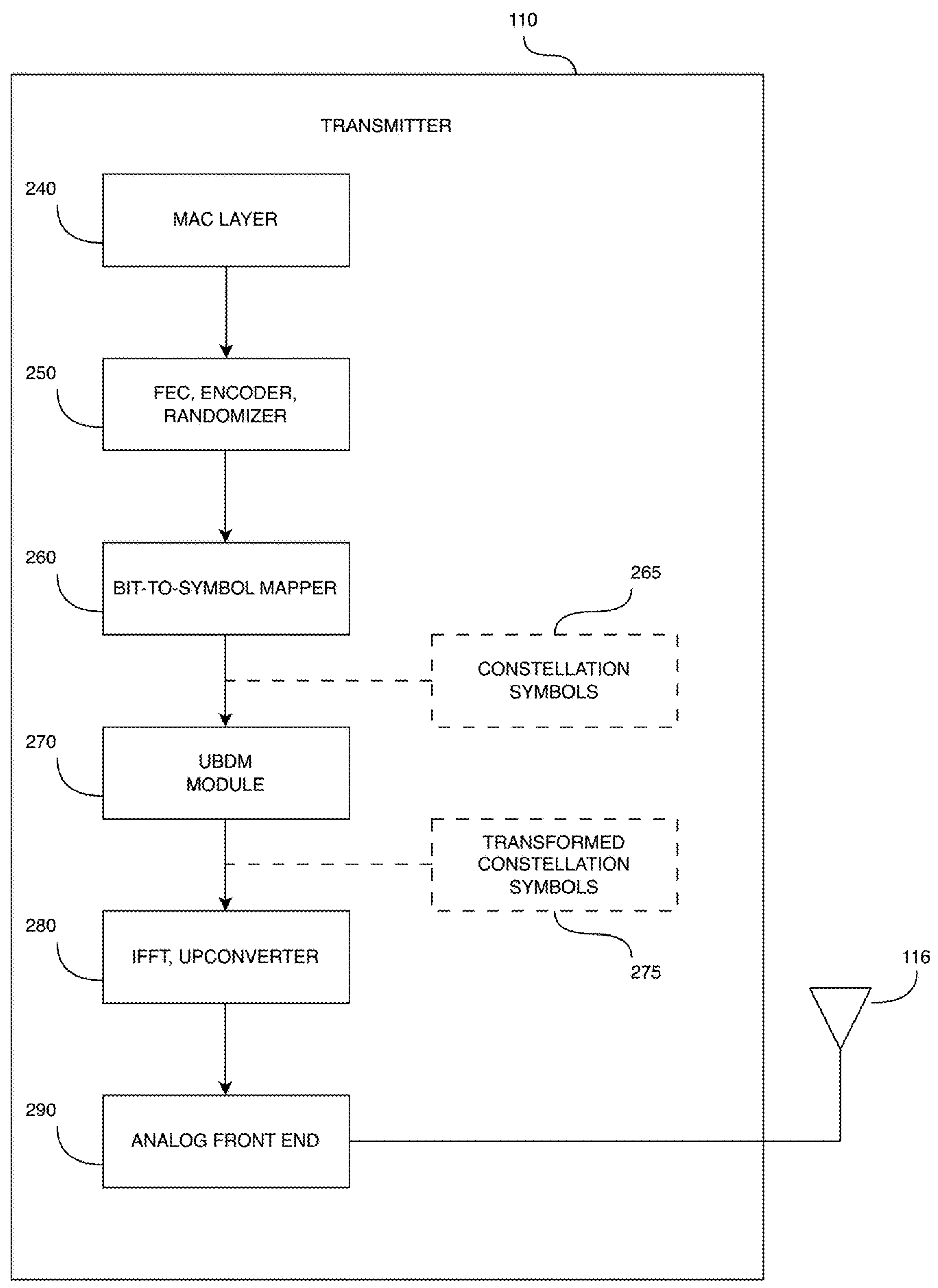
FIG. 2B is a block diagram of components in a wireless device configured to transmit a signal secured using a UBDM transformation, according to an example embodiment.

Referring now to FIG. 2B, an example illustrates a transmitter device 110 that is configured to perform the encoding process 200 at the physical layer (e.g., layer 1 of the Open System Interconnection (OSI) model). The transmitter device 110 obtains a set of data points (e.g., bits) to be transmitted in a message from higher layers in the OSI model through the Media Access Control (MAC) layer 240 (i.e., layer 2). The MAC layer 240 provides the data bits to a data preparation module 250, which modifies the data bits according to one or more schemes (e.g., Forward Error Correction (FEC), encoding via Physical Coding Sublayer (PCS), and/or randomization). The data preparation module 250 provides the modified data bits to a bit-to-symbol mapper 260, which converts groups of bits into symbols of a constellation according to a predetermined modulation scheme (e.g., Phase Shift Keying (PSK), Amplitude-Phase Shift Keying (APSK), Quadrature Amplitude Modulation (QAM), etc.). In one example, each symbol may be represented by a complex number with an in-phase and a quadrature component (i.e., I-Q points).

After the bit-to-symbol mapper 260 maps the data bits onto constellation symbols 265, it provides the constellation symbols 265 to the UBDM module 270. The UBDM module 270 transforms the constellation symbols 265 to transformed constellation symbols 275 according to the techniques described herein. In one example, the transformed constellation symbols 275 generated by the UBDM module 270 are distributed around the I-Q plane in a Gaussian distribution that is essentially indistinguishable from random noise. In contrast, the constellation symbols 265 that have not been transformed by the UBDM module 270 are distributed in a regular pattern in the I-Q plane, which is easily distinguished from random noise.

In another example, the UBDM module 270 preserves the total magnitude of a block of symbols, such that the average magnitude of the constellation symbols 265 is equal to the average magnitude of the transformed constellation. By maintaining the same average magnitude of the constellation symbols 265 through the UBDM module 270, the transmitter device 110 preserves the power of the transmitted data signal.

The UBDM module 270 provides the transformed constellation symbols 275 to a symbol preparation module 280 that is configured to prepare the transformed constellation symbols as a signal for wireless transmission. In one example, the symbol preparation module 280 may include applying an inverse Fast Fourier Transform (iFFT) and/or upconverting the signal from a baseband frequency to a transmission frequency. The symbol preparation module 280 provides the signal representing the transformed constellation symbols 275 to an analog front end 290 which transmits the signal via the antenna 116 of the transmitter device 110. In one example, the analog front end 290 may provide amplification and/or filtering of the signal representing the transformed constellation symbols 275.

In some embodiments, the transmitter device 110 may apply an automorphic transformation to data for transmission within a communications system. for instance, the transmitter device 110 may receive data (e.g., including real-valued data and/or complex data), and partition or subdivide the data into a plurality of data blocks. The transmitter device 110 may also receive at least one value including a random value (e.g., generated by and/or received from an RNG) or a pseudo-random value (e.g., generated by and/or received from a PRNG). The transmitter device 110 may generate an automorphism (e.g., in the UBDM module 270) based on the at least one value (and not based on the received data). The automorphism may include a linear transformation and/or an antilinear transformation.

In some implementations, each data block from the plurality of data blocks has a common predefined size. In other implementations, the data blocks from the plurality of data blocks can have differing sizes, for example within the plurality of data blocks at a given time, or varying over time according to a predefined pattern of changing data block sizes. In some such implementations, a representation of the block size may be transmitted/communicated with the transformed data block(s). The UBDM module 270 may apply the automorphism to each data block from plurality of data blocks, to produce a plurality of transformed data blocks, and causing transmission of a signal representing the plurality of transformed data blocks through the analog front end 290 and the antenna 116. Optionally, the UBDM module 270 may iteratively apply the automorphism a predefined number of times (e.g., twice, three times, four times, etc.) prior to the transmission from the antenna 116.

In some embodiments, a method includes receiving data (e.g., including real-valued data and/or complex data), and partitioning or subdividing the data into a plurality of data blocks. A series or sequence of automorphisms (e.g., two, three, four, or more automorphisms) can then be applied to each data block from the plurality of data blocks prior to transmission. For example, in one embodiment, during transformation, a first (e.g., generated by a first PRNG output) automorphism is applied to a given data block, to produce a first-transformed data block. A second (e.g., generated by a second PRNG output different from the first PRNG output) automorphism is then applied to the first-transformed data block, to produce a second-transformed data block. Next, a third automorphism (e.g., generated based on a first external factor) is applied to the second-transformed data block, to produce a third-transformed data block. Next, a fourth automorphism (e.g., generated based on a second external factor different from the first external factor) is applied to the third-transformed data block, to produce a fourth-transformed data block. Once the foregoing procedure has been applied to all data blocks, resulting in a plurality of fourth-transformed data blocks, the method can include causing transmission of a signal representing the plurality of fourth-transformed data blocks (e.g., to a remote receiver).

Figure 3:
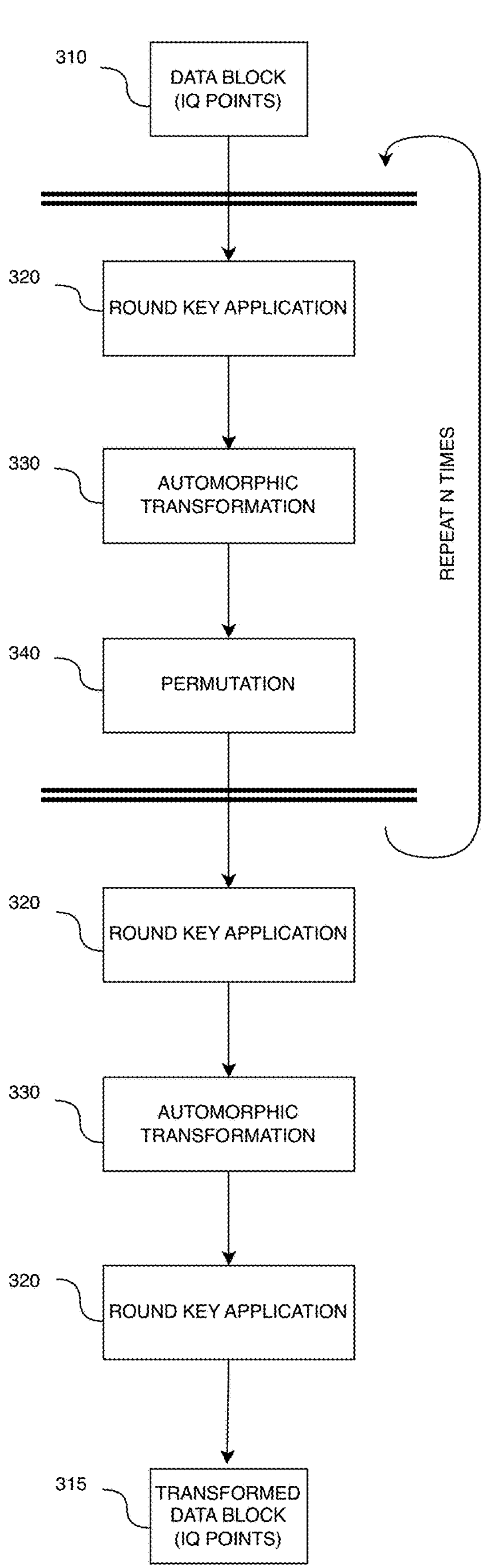
FIG. 3 is a block diagram illustrating an implementation of a UBDM transformation that transforms data in a data block, according to an example embodiment.

Referring now to FIG. 3, a block diagram illustrates an example of a UBDM transformation 300 transforming an input data block 310 into an output transformed data block 315. The UBDM transformation 300 iterates through layers that may include a round key application 320, an automorphic transformation 330, and a permutation 340. The initial layer of the UBDM transformation 300 sequentially processes the input data block with a round key application 320, an automorphic transformation 330, and a permutation 340. The UBDM transformation 300 sequentially applies the set of a round key application 320, an automorphic transformation 330, and a permutation 340 for N additional layers (e.g., 3-6 additional layers).

After the N layers of the round key application 320, the automorphic transformation 330, and the permutation 340, the UBDM transformation 300 includes an additional round key application 320, an additional automorphic transformation, and a final round key application 320. After the final round key application 320, the UBDM transformation 300 produces the output transformed data block 315. For instance, when N=5, the UBDM transformation includes a total of seven instances of the round key application 320, six instances of the automorphic transformation 330, and five instances of the permutation 340.

In one example, the round key application 320 modifies the values in the data block based on cryptographic material (e.g., a cryptographic key or a set of bits deterministically generated from the cryptographic key). Each instance of the round key application 320 in the UBDM transformation 300 may use different cryptographic material to modify the values of the data block. An example of an implementation of the round key application 320 is described hereinafter with respect to FIG. 4.

In another example, the automorphic transformation 330 may multiply the data points or components of the data points in the data block by a unitary matrix. For instance, the automorphic transformation 330 may multiply a data block of length L by an L×L unitary matrix. In another instance, the automorphic transformation 330 may subdivide the L×L unitary matrix into a plurality of smaller unitary matrices that are applied to different portions of the data block. For example, the automorphic transformation 330 may multiply a data block of length L=4 by a 4×4 unitary matrix. Alternatively, the automorphic transformation 330 may multiply the first two data points of four data points in a data block by a 2×2 unitary matrix and the second two data points by a different 2×2 unitary matrix. An example of an implementation of the automorphic transformation 330 is described hereinafter with respect to FIG. 5.

In a further example, the permutation 340 moves the position of at least one data point within the data block to a new position without changing the value of the data point. Additionally, at least one of the data points in the data block may remain in the same position after the permutation 340. In other words, the permutation 340 may keep some of the data points in a data block in the same positions and move other data points to a new position in the data block. An example of an implementation of the permutation 340 is described hereinafter with respect to FIG. 6.

In yet another example, the UBDM transformation 300 may include instances of the round key application 320 that differ based on different cryptographic material. Similarly, the UBDM transformation 300 may use different instances of the automorphic transformation 330. For instance, each instance of the automorphic transformation 330 may be based on a different unitary matrix that is unique within the UBDM transformation 300. In contrast, the UBDM transformation 300 may use a single instance the permutation 340 that is unchanged throughout the UBDM transformation 300.

Figure 4:
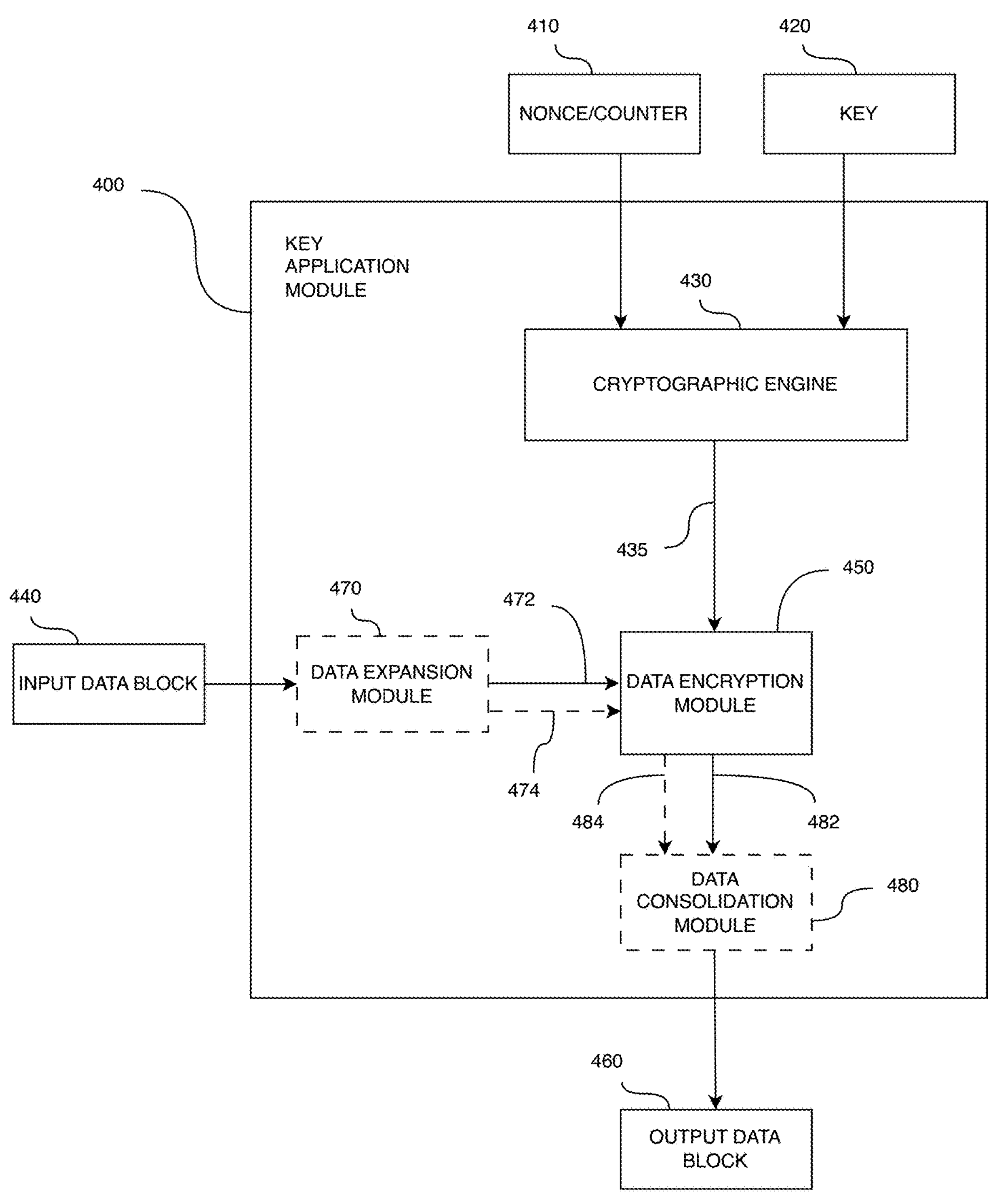
FIG. 4 is a block diagram of a key application module used in a UBDM transformation, according to an example embodiment.

Referring now to FIG. 4, a simplified block diagram illustrates a key application module 400 configured to apply a cryptographic key to a block of data (e.g., a round key application 320 in the UBDM transformation 300 described in FIG. 3). The key application module 400 obtains a nonce 410 and a cryptographic key 420 and uses a cryptographic engine 430 to generate a round key 435. In one example, the nonce 410 may include a counter that is incremented each time the key application module 400 runs. For instance, the cryptographic engine 430 may run in a counter mode that increments the nonce 410, but uses the same cryptographic key 420 each time the cryptographic engine generates a round key 435. In other examples, the cryptographic engine 430 may run in an Electronic Code Book (ECB) mode, a Cipher Block Chaining (CBC) mode, a Cipher Feedback (CFB) mode, or an Output Feedback (OFB) mode.

To modify data points, the key application module 400 obtains an input data block 440, applies the round key 435 with a data encryption module 450, which generates the output data block 460. In some instances, the data encryption module 450 may only apply a portion of the round key 435 to the input data block. For example, the cryptographic engine 430 may generate a round key 435 with 128 bits, but the data encryption module 450 may only apply the first 16 or 32 bits of the round key 435 to an input data block 440 that includes 16 data points.

Optionally, the key application module 400 may include a data expansion module 470 and a data consolidation module 480. The data expansion module 470 separates each data point in the input data block 440 into components, such as real components 472 and imaginary components 474 of complex data points (e.g., I-Q points). The data encryption module 450 may operate on the real components 472 and the imaginary components 474 separately to generate real components 482 and imaginary components 484 of complex data points in the output data block 460. The data consolidation module 480 may be configured to recover a single complex data point from the real component 482 and the imaginary component 484.

In one example, a plurality of round keys 435 may be pre-generated for a specific cryptographic key 420 and a specific sequence of nonces 410. Pre-generating a plurality of round keys 435 may shift a resource constraint from processing resources to storage resources. In other words, a computing device with limited processing resources may compute and store a plurality of round keys 435 before receiving data to transmit, freeing up the processing resources to operate other modules, such as the data encryption module 450.

In another example, the data encryption module 450 may manipulate the data points of the input data block 440 by selectively reversing the sign of a data point (or a component of a data point) based on a corresponding bit of the round key 435. For instance, if the input data block 440 consists of the points [1−i, −1−3i, −3+1, 3−i] and the first four bits of the round key 435 are [1 0 1 1], then the data encryption module may generate an output data block 460 consisting of [−1+i, −1−3i, 3−i, −3+i]. Alternatively, the data expansion module 470 may separate the input data block 440 into points [1, −1, −1, −3, −3, 1, 3, −1], which are operated on by the data encryption module 450 using eight bits of the round key 435, such as [1 0 1 1 1 0 0 1]. In this instance, the data encryption module 450 generates an output of [−1, −1, 1, 3, 3, 1, 3, 1], which the data consolidation module 480 converts to the complex points [−1−i, 1+3i, 3+1, 3+i] for the output data block 460.

Figure 5:
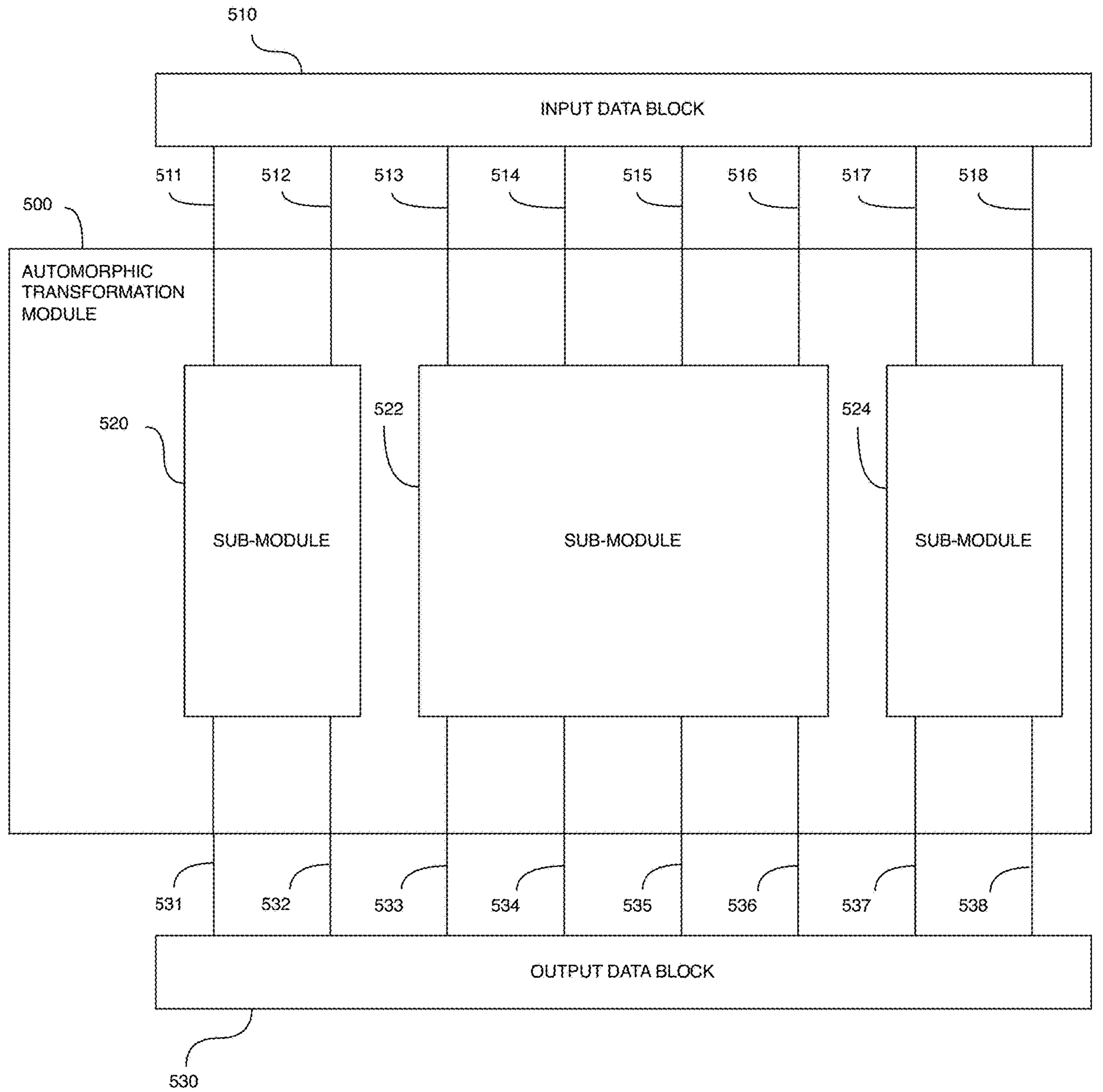
FIG. 5 is a block diagram of an automorphic transformation module used in a UBDM transformation, according to an example embodiment.

Referring now to FIG. 5, a simplified block diagram illustrates an automorphic transformation module 500 configured to apply an automorphism to a block of data (e.g., an automorphic transformation 330 in the UBDM transformation 300 described in FIG. 3). The automorphic transformation module 500 obtains an input data block 510 (e.g., an output data block 460 from a key application module 400 as described with respect to FIG. 4) that includes data points 511-518. A sub-module 520 of the automorphic transformation module 500 operates on the input data points 511 and 512 to generate output data points 531 and 532. Similarly, sub-module 522 of the automorphic transformation module 500 operates on the input data points 513, 514, 515, and 516 to generate output data points 533, 534, 535, and 536. Additionally, sub-module 524 of the automorphic transformation module 500 operates on the input data points 517 and 518 to generate output data points 537 and 538. The automorphic transformation module 500 outputs the output data points 531-538 as the output data block 530.

FIG. 5 illustrates an example embodiment of an automorphic transformation module 500 that transforms eight data points using three sub-modules of varying sizes. However, other embodiments of an automorphic transformation module may transform larger or smaller data blocks using more or fewer sub-modules. Additionally, the size of the sub-modules in other embodiments of the automorphic transformation module may be different or the same. For instance, some embodiments of the automorphic transformation module may transform eight data points using four sub-modules, which each operate on two of the data points.

In one example, each sub-module of the automorphic transformation module 500 may perform an automorphism on the input data points provided to the sub-module by multiplying a vector of the input data points by a unitary matrix. In some embodiments, pairs of complex values (z1, z2) are used to form an associated 2×2 unitary matrix, for example as follows:

$$(z_1, z_2) \mapsto \frac{1}{\sqrt{|z_1|^2 + |z_2|^2}} \begin{pmatrix} z_1 & z_2 \\ -z_2^* & z_1^* \end{pmatrix}.$$

Once this 2×2 unitary matrix is obtained, it can be applied to a pair of complex data points of a data block. The unitary matrix is the automorphism, and the unitary matrix acts on the data points, transforming them into two different data points.

In other embodiments, the complex values may be in the form $e^{i\theta}$, where θ is a real number. The $e^{i\theta}$ values can then be applied to complex data points of the multiple data blocks, for example by multiplication. In such embodiments, the automorphism may be as follows:

$$(z_1, z_2) \mapsto e^{i\theta} * (z_1, z_2)$$

A unitary matrix may be generated based on complex value pairs in the form ($e^{i2\pi\alpha}$, $e^{i2\pi\beta}$), where α and β are real numbers, for example as follows:

$$\left(e^{i2\pi\alpha}, e^{i2\pi\beta}\right) \mapsto \frac{1}{\sqrt{2}} \begin{pmatrix} e^{i2\pi\alpha} & e^{i2\pi\beta} \\ -e^{-i2\pi\beta} & e^{-i2\pi\alpha} \end{pmatrix}.$$

Generating an automorphism based on complex value pairs ($e^{i\alpha}$, $e^{i\beta}$) generated from real value pairs (α, β) allows a computing device (e.g., transmitter device 110 and/or receiver device 120) to generate unique unitary matrices from pairs of prime numbers. In other words, a computing device may generate unique automorphisms for each sub-module (e.g., sub-module 520) of each layer of a UBDM transformation (e.g., UBDM transformation 300). For instance, a UBDM transformation with L layers of automorphic transformations and K sub-modules in each layer would include K×L unique unitary matrices based on K+L+1 prime numbers. The unitary matrix U for each pair of prime number (a, b) may be given by:

$$U(a, b) \mapsto \frac{1}{\sqrt{2}} \begin{pmatrix} e^{\frac{2\pi i a}{P_{K+L+1}}} & e^{\frac{2\pi i b}{P_{K+L+1}}} \\ -e^{\frac{-2\pi i b}{P_{K+L+1}}} & e^{\frac{-2\pi i a}{P_{K+L+1}}} \end{pmatrix},$$

where a and b are selected from the first K+L prime numbers and $P_{K+1+1}$ is the next largest prime number.

The use of prime numbers as the real value pairs ensures that each unitary matrix is different, since the ratio of any two prime numbers is necessarily unique. In one example, using the first K+L prime numbers as pairs may provide a more significant difference in the ratio of prime numbers, which defines the unitary matrix U. However, other ranges of prime numbers may also be considered when generating unitary matrices for unique automorphisms. In another example, a set of mutually prime numbers (e.g., 4, 9, 25, 49, 121, etc.) may be used to define unique unitary matrices.

Figure 6:
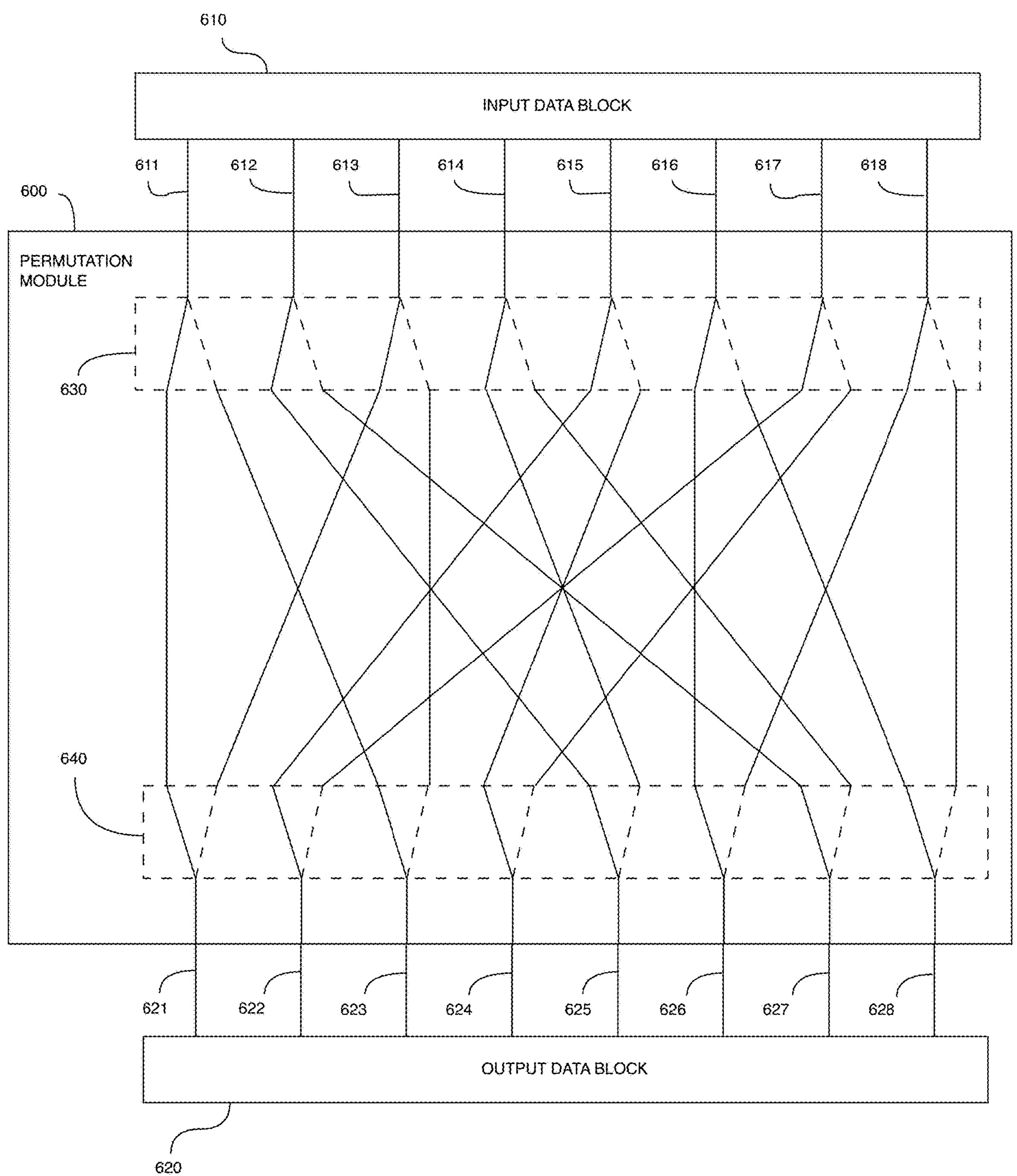
FIG. 6 is a block diagram of a permutation module used in a UBDM transformation, according to an example embodiment.

Referring now to FIG. 6, a simplified block diagram illustrates a permutation module 600 configured to permute the positions of data points in a block of data (e.g., a permutation 340 in the UBDM transformation 300 described in FIG. 3). The permutation module 600 obtains an input data block 610 with data points 611-618. The permutation module 600 is configured to permute the data points 611-618 into an output data block 620 with data points 621-628. In other words, the permutation module 600 changes the position of the data points within the input data block 610, but does not affect the value of the data points.

Optionally, the permutation module 600 may include a data expansion module 630 and a data consolidation module 640. The data expansion module 630 separates each data point in the input data block 610 into components, such as real components and imaginary components of complex data points (e.g., I-Q points). The permutation module 600 may operate on the real components and the imaginary components separately to permute the components as individual points. In this way, imaginary components and real components of different data points from the input data block 610 may be combined into a single complex number in the output data block 620.

In one example, the permutation module 600 may be configured to apply a walking permutation. A walking permutation maps the data point in the first position (e.g., the real component of input data point 611) to the same position (e.g., the real component of output data point 621), then maps the next data point to a position a predetermined number (e.g., four) of slots away. For instance, the imaginary component of the input data point 611 is mapped to the real component of the output data point 623. The permutation module 600 maps each subsequent component of the input data (e.g., input data block 610) to a position an additional predetermined number (e.g., four) slots away wrapping around to the beginning position, if necessary. If the output position has been previously mapped, then the permutation module 600 maps that particular input position to the next unmapped position after the predetermined number. In one instance, the walking permutation performed by the permutation module 600 may be visualized with the idea of a person walking four steps to place a marker on the ground, with the person continuing to walk if the fourth step already contains a marker until they find the next free spot.

In another instance, the walking permutation may be mathematically visualized by ordering the input data points as an input vector, partitioning the input vector into an intermediate matrix with a predetermined number of columns (e.g., four), transposing the intermediate matrix, and flattening the transposed matrix:

$$(1\ 2\ 3\ 4\ 5\ 6\ 7\ 8\ 9\ 10\ 11\ 12\ 13\ 14\ 15\ 16)$$

$$\xrightarrow{Partition}\begin{bmatrix}1 & 2 & 3 & 4\\ 5 & 6 & 7 & 8\\ 9 & 10 & 11 & 12\\ 13 & 14 & 15 & 16\end{bmatrix}\xrightarrow{Transpose}\begin{bmatrix}1 & 5 & 9 & 13\\ 2 & 6 & 10 & 14\\ 3 & 7 & 11 & 15\\ 4 & 8 & 12 & 16\end{bmatrix}\xrightarrow{Flatten}$$

$$(1\ 5\ 9\ 13\ 2\ 6\ 10\ 14\ 3\ 7\ 11\ 15\ 4\ 8\ 12\ 16).$$

In this way the first position of the input data block is mapped to the first position of the output data block, the second position of the input data block is mapped to the fifth position of the output data block, the third position of the input data block is mapped to the ninth position of the output data block, and so on.

In another example, the permutation module 600 may be configured to apply a different walking permutation (i.e., with a different predetermined number) or a different type of permutation (e.g., circular permutation, partial permutation, etc.) to the data points of the input data block 610. Additionally, different instances of the permutation module 600 within the same UBDM transformation may apply different permutations to their respective input data block 610. For instance, each layer of a UBDM transformation may apply a different permutation of the input data block provided at that respective layer.

In a further example, the permutation module 600 may be configured to apply a permutation to the input data block 610 based on a lookup table (LUT) that directly correlates each input data point position with the corresponding output data point position. For instance, the permutation module 600 may be preconfigure the results of the walking permutation into a LUT, rather than compute the permutation each time an instance of the permutation module 600 runs.

Figure 7:
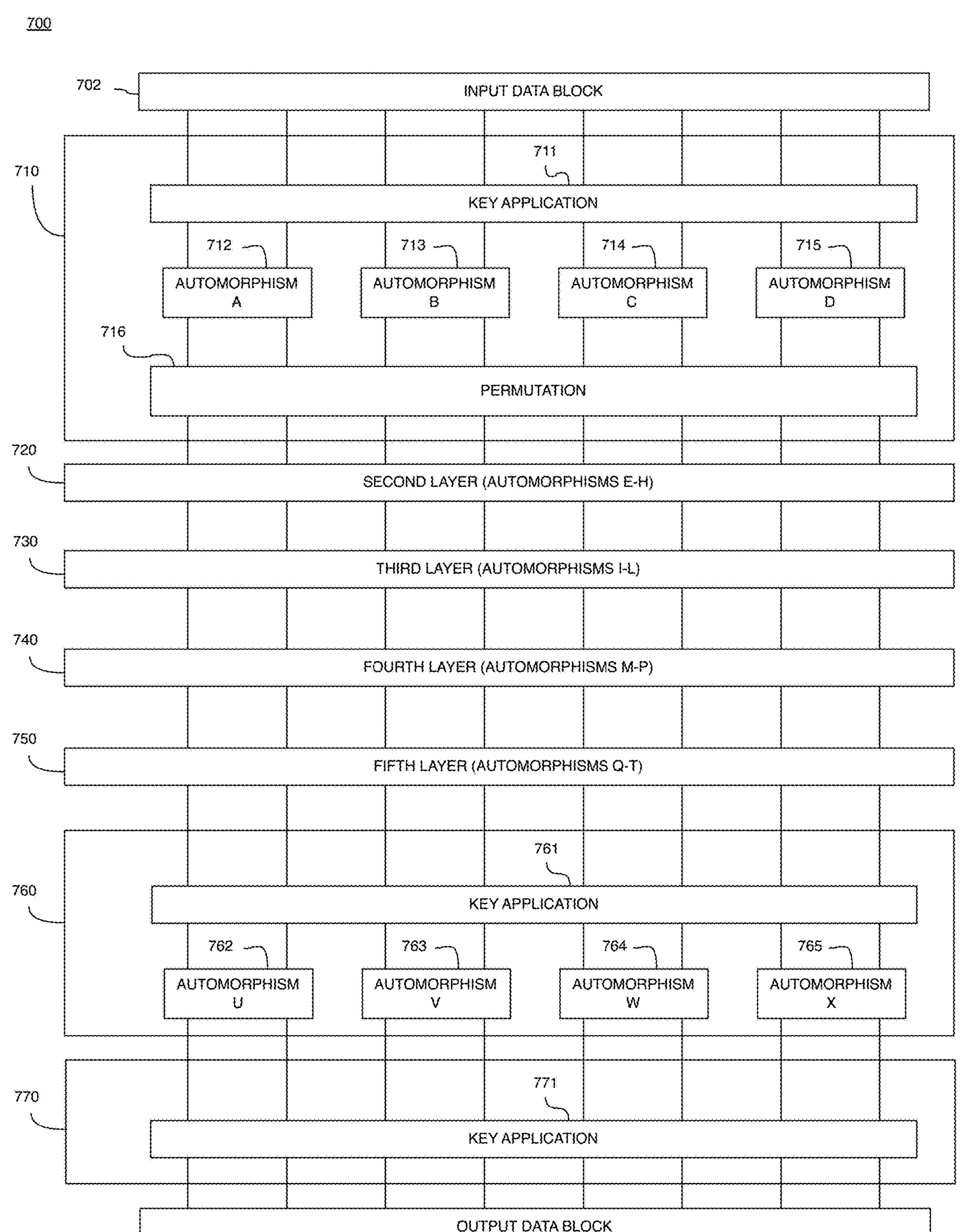
FIG. 7 is a block diagram that illustrates the layered structure of a UBDM transformation, according to an example embodiment.

Referring now to FIG. 7, a block diagram illustrates a UBDM transformation 700 that is implemented in multiple layers of key applications, automorphisms, and permutations. The UBDM transformation 700 transforms an input data block 702 through seven layers to generate an output data block 704. In one example, the input data block 702 and the output data block 704 may contain eight complex I-Q data points for wireless transmission. As shown in FIG. 7, each complex I-Q data point is represented by a vertical line running from the input data block 702 through the seven layers of the UBDM transformation 700 to the output data block 704.

The first layer 710 of the UBDM transformation 700 includes a key application 711 that operates on each input data point, for instance, as shown with respect to FIG. 4. After the key application 711, the first layer 710 includes automorphism 712, automorphism 713, automorphism 714, and automorphism 715. Each of the automorphisms 712-715 operate on two complex numbers to generate and output two new complex numbers. In one example, each of the automorphisms 712-715 may be based on a separate pair of complex numbers, as described herein with respect to FIG. 6. Additionally, the pair of complex numbers may be based on pairs of prime numbers. For instance, the automorphism 712 may be based on the prime pair (2,113), the automorphism 713 may be based on the prime pair (3,167), the automorphism 714 may be based on the prime pair (5,107), and the automorphism 715 may be based on the prime pair (7,163).

After the automorphisms 712-715, the first layer includes a permutation 716. In one example, the permutation 716 operates on eight complex numbers. Alternatively, the permutation 716 may operate on real components and imaginary components of the eight complex numbers. For instance, the permutation 716 may operate as described with respect to FIG. 6, optionally with a data expansion module separating the input data into real components and imaginary components and a data consolidation module recovering complex numbers from the permuted real and imaginary components.

The UBDM transformation 700 includes four additional layers (i.e., second layer 720, third layer 730, fourth layer 740, and fifth layer 750) that are analogous to the first layer 710. In other words, each of the second layer 720, third layer

730, fourth layer 740, and fifth layer 750 includes a key application that is analogous to the key application 711 in the first layer, automorphisms analogous to the automorphisms 712-715 in the first layer 710, and a permutation analogous to the permutation 716 in the first layer 710.

After the fifth layer 750, the UBDM transformation 700 includes a sixth layer 760. The sixth layer 760 includes a key application 761 and automorphisms 762-765. In other words, the sixth layer 760 is similar to the first layer 710, without a permutation analogous to the permutation 716 of the first layer 710. The UBDM transformation 700 includes a seventh layer 770, which includes a key application 771.

After the UBDM transformation 700 process the input data block 702 through all seven layers, the UBDM transformation 700 produces the output data block 704. The resulting data points in the output data block 704 may be transmitted as I-Q points that are distributed in the I-Q plane as a Gaussian distribution. By reversing the steps in the UBDM transformation 700, a receiver may recover the transmitted I-Q points in the output data block 704, as long as the receiver has the cryptographic key used in the key application steps. Without the cryptographic key, any receiver will recover a series of I-Q points that is essentially indistinguishable from white noise.

In one example, the automorphisms in the second, third, fourth, fifth, and sixth layers may be based on separate complex pairs that are different from each other and from the complex pairs on which the automorphisms in the first layer are based. For instance, the automorphisms of the UBDM transformation may be based on the prime pairs listed in Table I:

TABLE I

Example prime pairings for automorphisms in a UBDM transformation
Prime Value Pairs

| | | | | |
|---|---|---|---|---|
| First layer | (2, 3) | (5, 7) | (11, 13) | (17, 19) |
| Second Layer | (23, 29) | (31, 37) | (41, 43) | (47, 53) |
| Third Layer | (59, 61) | (67, 71) | (73, 79) | (83, 89) |
| Fourth Layer | (97, 101) | (103, 107) | (109, 113) | (127, 131) |
| Fifth Layer | (137, 139) | (149, 151) | (157, 163) | (167, 173) |
| Sixth Layer | (179, 181) | (191, 193) | (197, 199) | (211, 223) |

The prime pairs in Table I are selected from the first forty-eight prime numbers paired in numerical order. In other examples, the prime numbers may be grouped into different pairs. For instance, the prime pairings may be based on the fractional phase of each of these prime numbers in comparison to a higher prime number $p_t$. Each prime number $p_i<p_t$ may be converted to a fractional phase shift $e^{\theta_{p_i}}$ according to $$\theta_{p_i} = \frac{2\pi i * p_i}{p_i}.$$

In other instances, the prime pairings may be based on a corresponding relative angle, $\phi_{p_i}$, that shows the distance to the nearest axis as a phase shift in the first quadrant:

$$\phi_{p_i} = \min\left[\frac{\pi}{2} - \arg\left(\left|\Re[\theta_{p_i}]\right| + i\left|\mathcal{J}[\theta_{p_i}]\right|\right), \arg\left(\left|\Re[\theta_{p_i}]\right| + i\left|\mathcal{J}[\theta_{p_i}]\right|\right)\right].$$

In other examples, the prime pairs may be selected based on different criteria. For instance, the prime numbers may be paired in simple ascending order. Alternatively, the prime numbers may be paired based on criteria imposed on the relative angle $\phi_{p_i}$, such as maximizing or minimizing the distance between $\phi_{p_i}$, or minimizing the difference in $\phi_{p_i}$ over all of the prime pairs.

Figure 8:
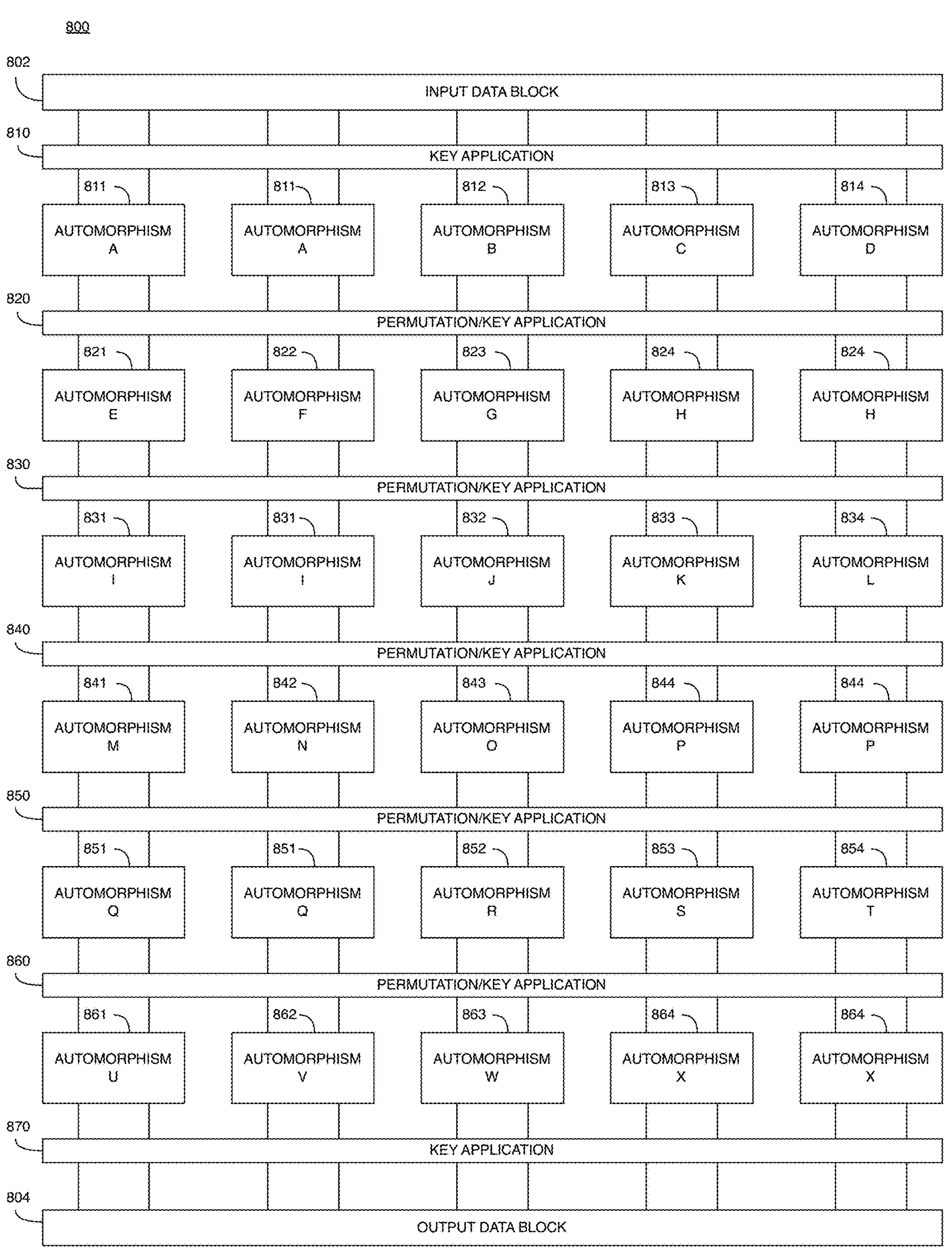
FIG. 8 is a block diagram that illustrates the repetition of automorphic transformations within each layer of the UBDM transformation, according to an example embodiment.

Referring now to FIG. 8, an example of a UBDM transformation 800 that transforms an input data block 802 of ten data points (e.g., complex I-Q points in a modulation constellation) into an output data block 804 of ten data points that are randomly distributed (e.g., I-Q points in a Gaussian distribution). The UBDM transformation 800 includes an initial key application 810 that adds a cryptographic key to the input data block 802, for instance, as described with respect to FIG. 4. After the initial key application 810, the UBDM transformation 800 applies automorphisms 811, 812, 813, and 814. In one example, the automorphisms 811-814 are the same as the automorphisms 712-715 as shown in the first layer of Table I.

After the layer of automorphisms 811-814, the UBDM transformation 800 includes a permutation and key application layer 820. The layer 820 permutes the data points, or components of the data points (e.g., as described with respect to FIG. 6) and adds another portion of cryptographic material (e.g., as described with respect to FIG. 4). The UBDM transformation 800 follows the layer 820 with another layer of automorphisms 821-824. Similarly, the UBDM transformation 800 then includes another permutation and key application 830 followed by a third layer of automorphisms 831-834, a permutation and key application layer 840 followed by a fourth layer of automorphisms 841-844, a permutation and key application layer 850 followed by a fifth layer of automorphisms 851-854, and a permutation and key application layer 860 followed by a sixth layer of automorphisms 861-864. After the sixth layer of automorphisms 861-864, the UBDM transformation 800 includes a final key application 870 and produces the output data block 804.

Because each automorphism (e.g., automorphism 811) transforms two data points, and each layer of automorphisms (e.g., automorphisms 811-814) receives ten data points, the UBDM transformation 800 repeats one of the automorphisms (e.g., automorphism 811) in each layer. For instance, automorphisms 811, 824, 831, 844, 851, and 864 are repeated in the first, second, third, fourth, fifth, and sixth layer of automorphisms, respectively.

The UBDM transformation 800 may be further extended to process input data blocks of larger size by repeating additional automorphisms. For instance, the UBDM transformation 800 may process a data block containing sixteen data points by repeating all of the automorphisms in each layer. Additionally, automorphisms may be repeated multiple times to process larger data blocks. In other words, to process a data block with eighteen data points, the UBDM transformation 800 may repeat all of the automorphisms, as it would to process sixteen data points, and repeat one automorphism a third time per layer to enable all eighteen data points to be processed.

Figure 9:
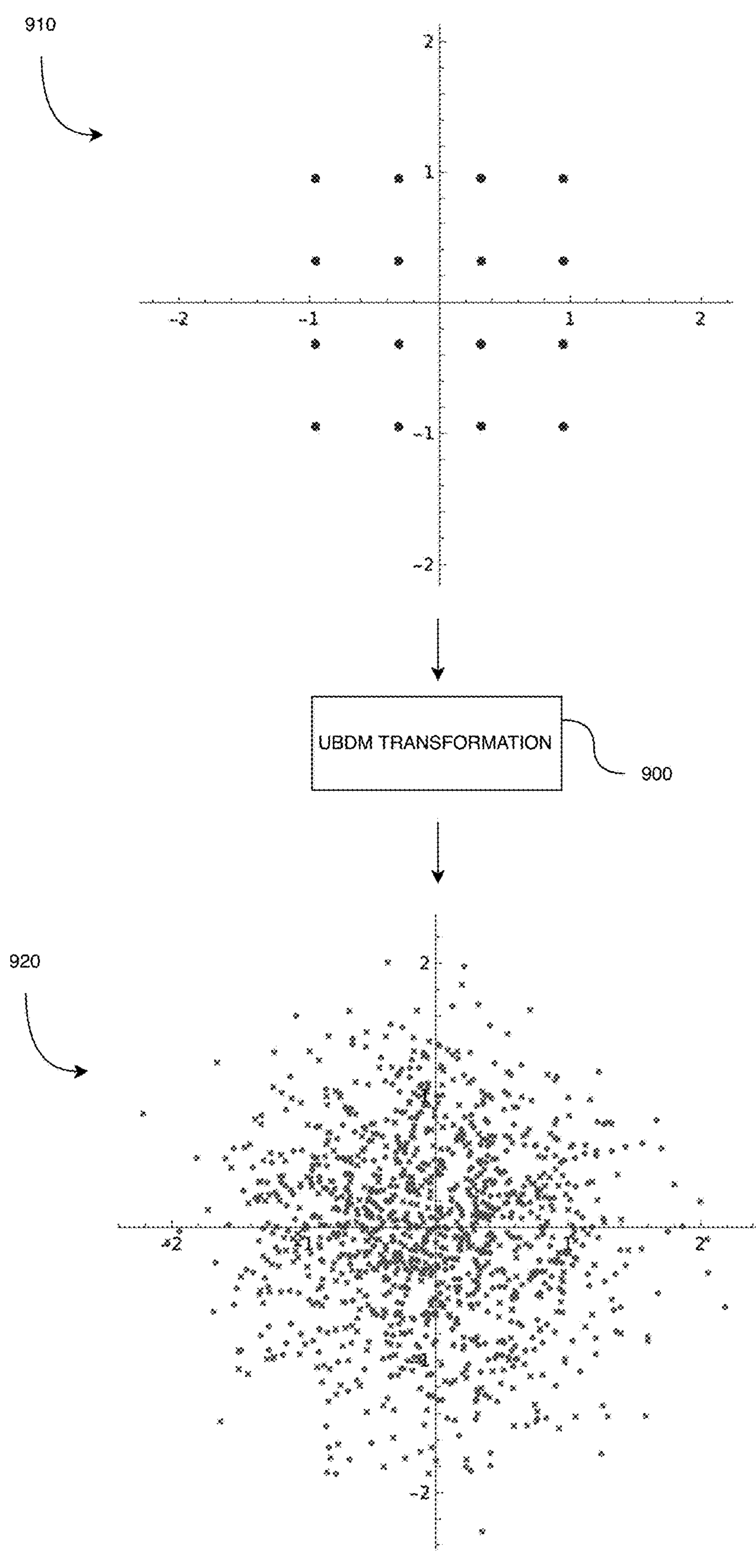
FIG. 9 illustrates the effect of a UBDM transformation on a signal encoded with a 16-QAM modulation format, according to an example embodiment.

Referring now to FIG. 9, a pair of graphs illustrates the effect of a UBDM transformation 900 on a typical modulated signal. The graph 910 shows data points of a signal that has been modulated in accordance with a 16-QAM modulation scheme. The data points in the graph 910 are clearly distinguishable in a constellation of I-Q points. The I-Q points of the 16-QAM modulated signal have predefined positions that are typically associated with a sequence of four bits.

In contrast, after applying the UBDM transformation 900 to the 16-QAM signal, the data points are distributed around the I-Q plane, as shown by graph 920. In one example, the total power of the 16-QAM signal shown in graph 910 is maintained in the UBDM signal shown in graph 920. In other words, the average magnitude of the data points in the graph 910 may be substantially equal to the average magnitude of the data points in the graph 920.

In one example, the graph 910 may represent multiple data blocks of input data, and the UBDM transformation 900 may operate on each data block separately to generate the data points shown in graph 920. The UBDM transformation 900 obtains modulated points as input, and returns I-Q points that are essentially indistinguishable from Gaussian noise. However, any individual block of data points may not be indistinguishable from Gaussian noise (e.g., due to the power preserving property of the UBDM transformation 900).

Figure 10:
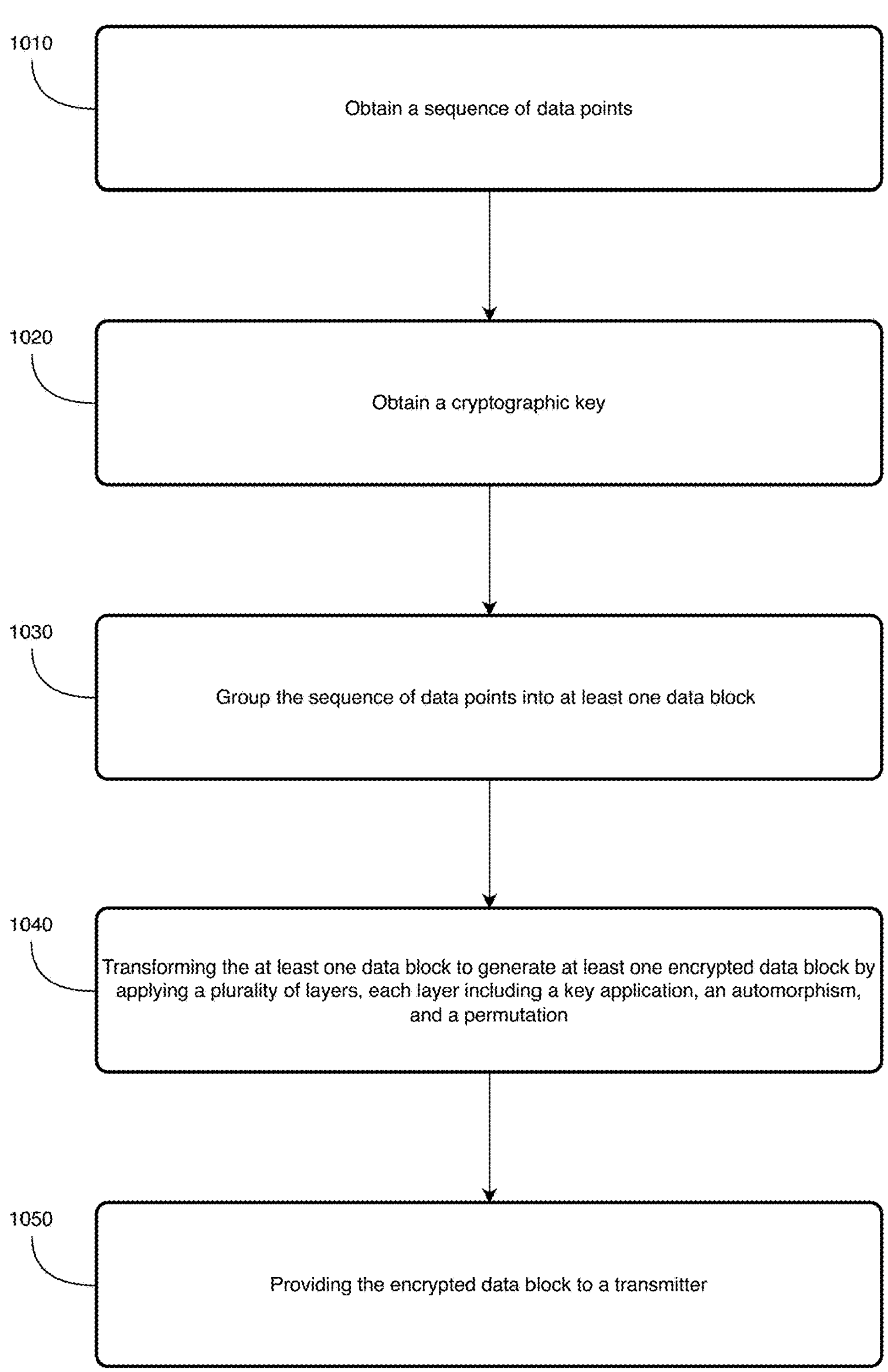
FIG. 10 is a flowchart that illustrates a process performed by a computing device to encrypt data with a UBDM transformation for transmission, according to an example embodiment.

Referring now to FIG. 10, a flowchart illustrates an example process 1000 performed by a computing device (e.g., computing device 110) to encrypt a block of data using a UBDM transformation. At 1010, the computing device obtains a sequence of data points for transmission. In one example, the sequence of data points may be a sequence of complex numbers. In another example, the sequence of data points may be a sequence of data bits or a sequence of data symbols (e.g., I-Q points).

At 1020, the computing device obtains a cryptographic key to encrypt the sequence of data points. In one example, the cryptographic key may be generated by a random number generator or a pseudorandom number generator. In another example, the computing device may generate additional cryptographic material (e.g., key expansion, round keys, etc.) from the cryptographic key. For instance, the computing device may generate round keys using secure ciphers, (e.g., based on Advanced Encryption Standard (AES), Speck, or Simon).

At 1030, the computing device groups the sequence of data points into at least one data block. In one example, the maximum size of the data block may be determined by the size of the cryptographic key obtained at 1020. For instance, a cryptographic key with 256 bits may restrict the size of the data block to 128 data points based on the cryptographic processes involved in the UBDM transformation.

At 1040, the computing device transforms the at least one data block to generate at least one encrypted data block by applying a plurality of layers. Each layer among the plurality of layers includes a key application, an automorphism, and a permutation. In one example, the computing device may include one or more additional layers that include one or more of a key application, an automorphism, or a permutation.

At 1050, the computing device provides the encrypted data block to a transmitter. In one example, the transmitter may be communicatively coupled to the computing device. In another example, the transmitter and computing device may be integrated into a single apparatus.

In one example of the process 1000, the computing device may determine a round key (e.g., derived from the cryptographic key obtained at 1020) associated with each layer. Some or all of the bits in the round key may be applied to the data points at the corresponding layer (e.g., through the key application). Additionally, some of the bits of the round key may be ignored and discarded. For instance, if the size of the data block is N, and the key application in a layer requires K bits of cryptographic material, where K<N, then the computing device may only use the first K bits of the round key and discard the remaining N−K bits.

In another example, the data points may be expanded into components (e.g., real components and imaginary components) for the application of the key application, the automorphism, and/or the permutation. For instance, complex data points may be expanded into real components and imaginary components before and/or after each operation of each layer. In some instances, the complex data points may remain expanded into real and imaginary components if consecutive operations are configured to operate on the separate components of the data points. In other words, if a key application that operates on real and imaginary components immediately follows a permutation that has already expanded the data points into real and imaginary components, then the computing device may refrain from recombining the real and imaginary components into complex data points between the permutation and the key application.

In a further example, the automorphism of each layer may include a plurality of primitive transformations. Additionally, the primitive transformations may be based on unitary matrices. The unitary matrices of the primitive transformations may be based on pairs of prime numbers. In some instances, the unitary matrices of each primitive transformation may be unique within the layer and/or within the entire UBDM transformation. Alternatively, some or all of the unitary matrices may be repeated within a layer (e.g., to accommodate a larger block size).

Figure 11:
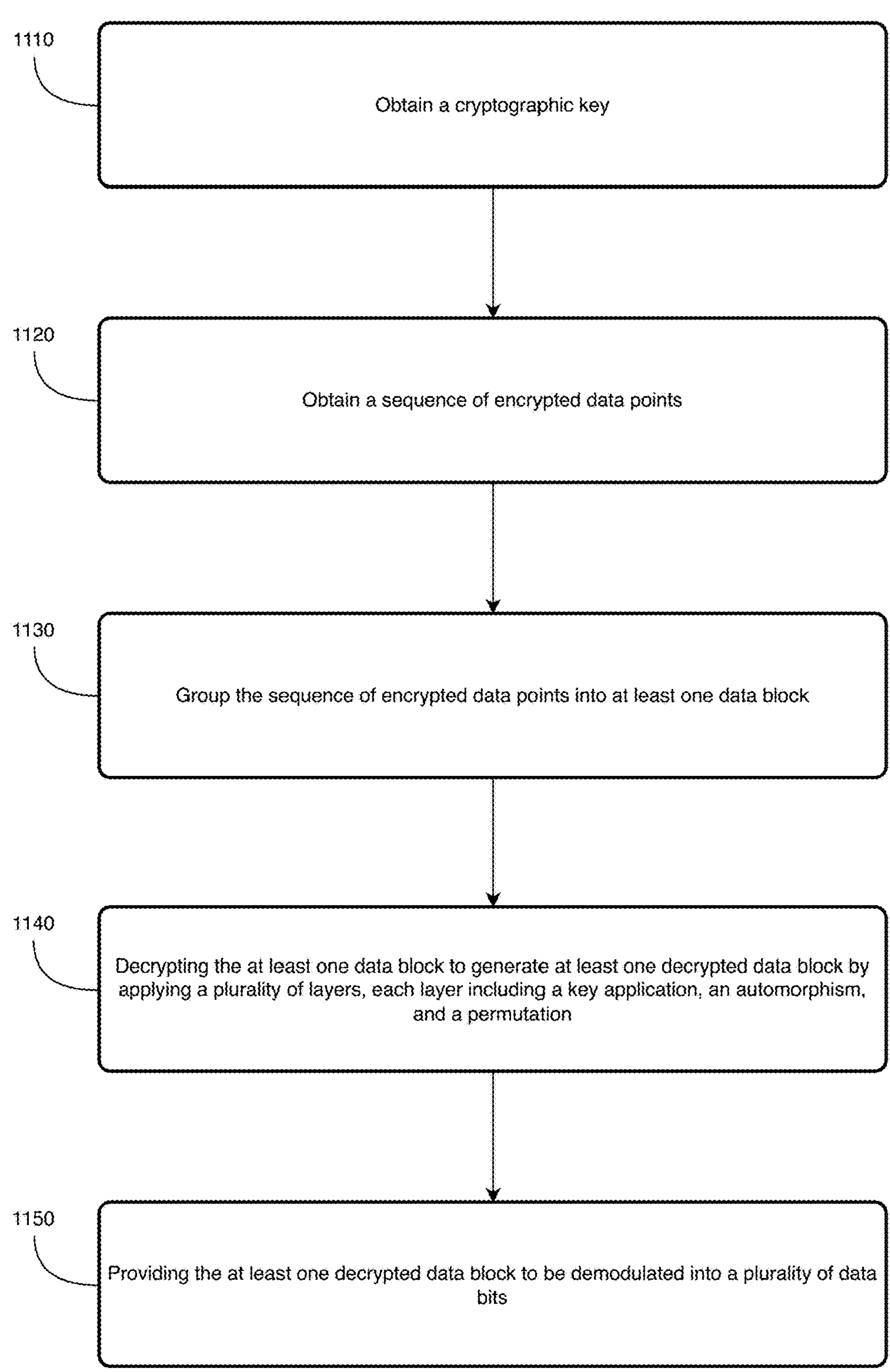
FIG. 11 is a flowchart that illustrates a process performed by a computing device to decrypt UBDM-encrypted data, according to an example embodiment.

Referring now to FIG. 11, a flowchart illustrates an example process 1100 performed by a computing device (e.g., computing device 120) to recover a block of data using a UBDM transformation. At 1110, the computing device obtains a cryptographic key to decrypt data signals that were encrypted with a UBDM transformation. In one example, the cryptographic key may be generated by a random number generator or a pseudorandom number generator. In another example, the computing device may generate additional cryptographic material (e.g., key expansion, round keys, etc.) from the cryptographic key. For instance, the computing device may generate round keys using secure ciphers, (e.g., based on Advanced Encryption Standard (AES), Speck, or Simon).

At 1120, the computing device obtains a sequence of encrypted data points. In one example, the sequence of encrypted data points may be a sequence of complex numbers that were sampled from a received wireless signal. In another example, the sequence of encrypted data points may be a sequence of data symbols (e.g., I-Q points).

At 1130, the computing device groups the sequence of encrypted data points into at least one data block. In one example, the size of the data block may be determined by the size of the cryptographic key obtained at 1120. For instance, a cryptographic key with 256 bits may restrict the size of the data block to 128 data points based on the cryptographic processes involved in the UBDM transformation.

At 1140, the computing device transforms the at least one encrypted data block to generate at least one decrypted data block by applying a plurality of layers. Each layer among the plurality of layers includes a key application, an automorphism, and a permutation. In one example, the computing device may include one or more additional layers that include one or more of a key application, an automorphism, or a permutation.

At 1150, the computing device provides the decrypted data block to a demodulator to be demodulated into a plurality of data bits. In one example, the demodulator may be communicatively coupled to the computing device. In another example, the demodulator and computing device may be integrated into a single apparatus.

In one example of the process 1100, the computing device may determine a round key (e.g., derived from the cryptographic key obtained at 1120) associated with each layer. Some or all of the bits in the round key may be applied to the data points at the corresponding layer (e.g., through the key application). Additionally, some of the bits of the round key may be ignored and discarded. For instance, if the size of the data block is N, and the key application in a layer requires K bits of cryptographic material, where $K<N$, then the computing device may only use the first K bits of the round key and discard the remaining $N-K$ bits.

In another example, the data points may be expanded into components (e.g., real components and imaginary components) for the application of the key application, the automorphism, and/or the permutation. For instance, complex data points may be expanded into real components and imaginary components before and/or after each operation of each layer. In some instances, the complex data points may remain expanded into real and imaginary components if consecutive operations are configured to operate on the separate components of the data points. In other words, if a key application that operates on real and imaginary components immediately follows a permutation that has already expanded the data points into real and imaginary components, then the computing device may refrain from recombining the real and imaginary components into complex data points between the permutation and the key application.

In a further example, the automorphism of each layer may include a plurality of primitive transformations. Additionally, the primitive transformations may be based on unitary matrices. The unitary matrices of the primitive transformations may be based on pairs of prime numbers. In some instances, the unitary matrices of each primitive transformation may be unique within the layer and/or within the entire UBDM transformation. Alternatively, some or all of the unitary matrices may be repeated within a layer (e.g., to accommodate a larger block size).

Figure 12:
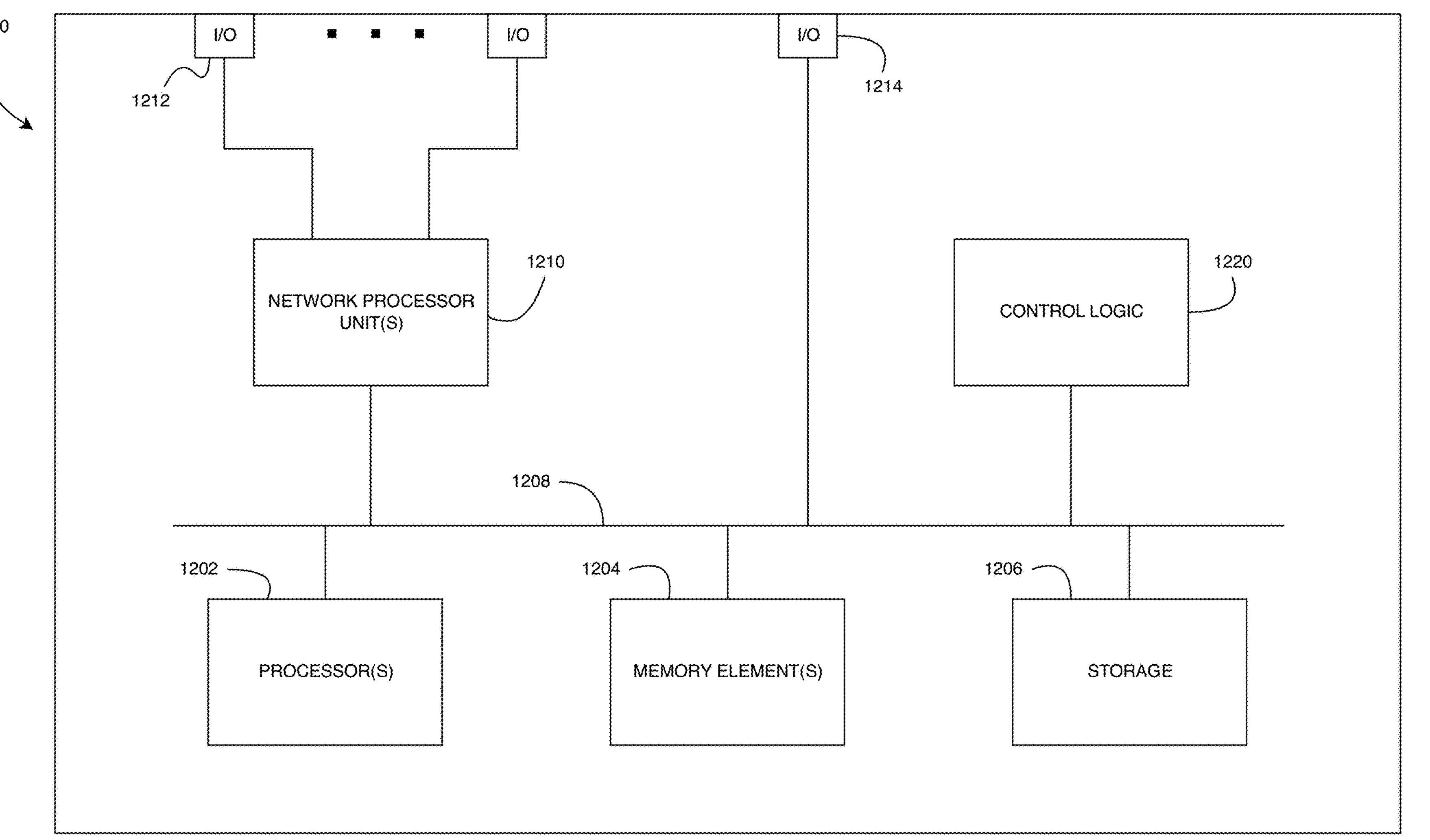
FIG. 12 is a block diagram of a computing device that may be configured to perform the techniques presented herein, according to an example embodiment.

Referring now to FIG. 12, a hardware block diagram depicts a computing device 1200 that may perform functions associated with operations described herein in connection with the techniques depicted in FIGS. 1, 2A, 2B, and 3-11. In various embodiments, a computing device, such as computing device 1200 or any combination of computing devices 1200, may be configured as any entity/entities as discussed for the techniques depicted in connection with FIGS. 1, 2A, 2B, and 3-11 in order to perform operations of the various techniques discussed herein. In some instances, one or more computing devices 1200 (e.g., servers) may be deployed in a cloud or distributed computing environment to perform one or more of the techniques described herein.

In at least one embodiment, the computing device 1200 may include one or more processor(s) 1202, one or more memory element(s) 1204, storage 1206, a communication bus 1208, one or more network processor unit(s) 1210 interconnected with one or more network input/output (I/O) interface(s) 1212, and control logic 1220. In various embodiments, instructions associated with logic for computing device 1200 may overlap in any manner and are not limited to the specific allocation and/or operations described herein.

In at least one embodiment, processor(s) 1202 is/are at least one hardware processor configured to execute various tasks, operations, and/or functions for computing device 1200 as described herein according to software and/or instructions configured for computing device 1200. Processor(s) 1202 (e.g., a hardware processor) can execute any type of instructions associated with data to achieve the operations detailed herein. In one example, processor(s) 1202 can transform an element or an article (e.g., data, information, etc.) from one state or thing to another state or thing. Any of potential processing elements, microprocessors, digital signal processors, floating point gate arrays (FPGAs), graphical processor units (GPUs), secure processors, baseband signal processors, modems, PHY elements, controllers, systems, managers, logic, and/or machines described herein can be construed as being encompassed within the broad term 'processor.'

In at least one embodiment, memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, communication bus 1208 can be configured as an interface that enables one or more elements of computing device 1200 to communicate in order to exchange information and/or data. Communication bus 1208 can be implemented with any architecture designed for passing control, data, and/or information between processors, memory elements/storage, peripheral devices, and/or any other hardware and/or software components that may be configured for computing device 1200. In at least one embodiment, communication bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 (wired and/or wireless) to facilitate operations discussed for various embodiments described herein. In various embodiments, network processor unit(s) 1210 can be configured as a combination of hardware and/or software, such as one or more Ethernet driver(s) and/or controller(s) or interface card(s), optical (e.g., Fibre Channel) driver(s) and/or controller(s), wireless receivers/transmitters/transceivers, baseband processor(s)/modem(s), and/or other similar network interface driver(s) and/or controller(s) now known or hereafter developed to enable communications between computing device 1200 and other systems, entities, etc., to facilitate operations for various embodiments described herein. In various embodiments, network I/O interface(s) 1212 can be configured as one or more Ethernet port(s), Fibre Channel port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information with other entities that may be connected to computing device 1200. For example, I/O interface(s) 1214 may provide a connection to external devices such as a keyboard, keypad, touch screen, microphone or microphone array, camera, video capture device, and/or other suitable input and/or output device now known or hereafter developed. In some instances, external devices may also include portable computer readable (non-transitory) storage media such as database systems, flash memory drives, portable optical or magnetic disks, and/or other memory cards. In some instances, external devices may include a mechanism to display data to a user, such as a computer monitor, a display screen, an audio speaker, and/or other output device.

In various embodiments, control logic 1220, can include instructions that, when executed, cause processor(s) 1202 to perform operations, which can include, but not be limited to, providing overall control operations of computing devices; interacting with other entities, systems, etc., described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), secure memory module, tamper-proof memory, application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure; all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in an Application Specific Integrated Circuit (ASIC), Digital Signal Processing (DSP) instructions, software (potentially inclusive of object code and/or source code), etc.) for execution by one or more processor(s), and/or other similar machines. Generally, memory element(s) 1204 and/or storage 1206 may store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, and/or the like that are executed to carry out operations in accordance with the teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, flash drives, and/or smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium.

As used herein, a 'transmitter' (or 'signal transmitter') refers to any collection of components that are used in the transmission of signals, including any combination of, but limited to, one or more: antennas, amplifiers, cables, digital-to-analog converters, analog-to-digital converters, filters, up-converters, encoders, modulators, multiplexers, processors (e.g., for reading bits and/or mapping of bits to a baseband), control circuitry, oscillators, etc. Similarly, as used herein, a 'receiver' (or 'signal receiver') refers to any collection of components that are used in receiving signals, including any combination of, but limited to, one or more: antennas, amplifiers, cables, analog-to-digital converters, digital-to-analog converters, filters, down-converters, decoders, demodulators, demultiplexers, processors, detectors, control circuitry, oscillators, etc. Further the transmitter and receiver may be implemented using analog components, digital components, or a mix of analog and digital components. Further the transmitter and receiver may use analog signals, digital signals, or a mix of analog and digital signals.

Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/6G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly be connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of,' one or more of, 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of and 'one or more of can be represented using the '(s)' nomenclature (e.g., one or more element(s)).

In summary, the techniques presented herein encrypt waveforms using a UBDM transformation at the physical layer, eliminating the wireless attack surface. The UBDM transformation includes three components: round key generation/application, automorphism application (e.g., though unitary matrix multiplication), and permutation of data values. These three components may be iteratively applied in layers to generate a final output signal that essentially resembles Gaussian noise over a wireless transmission, while remaining recoverable at a receiver device with the appropriate cryptographic key.

Modern network security strategies frequently do not prevent attacks, but instead are reactive strategies that look for attacks after they happen. The UBDM transformation described herein combines digital modulation and encryption, operating at the OSI physical layer to transform constellation points into different complex values before passing the complex values to an analog front end for filtering, upconversion, and transmission.

In some aspects, the techniques described herein relate to a method, including: obtaining a sequence of data points and a cryptographic key at a processor; grouping the sequence of data points into at least one data block of a predetermined length; transforming the at least one data block to generate at least one encrypted data block by applying a plurality of layers, wherein each layer among the plurality of layers includes a key application transformation based on the cryptographic key, an automorphism, and a permutation; and providing the at least one encrypted data block to a transmitter.

In some aspects, the techniques described herein relate to a method, further including applying at least one additional layer to the at least one encrypted data block, the at least one additional layer including an additional key application transformation or an additional automorphism.

In some aspects, the techniques described herein relate to a method, further including applying a final key application transformation after the at least one additional layer.

In some aspects, the techniques described herein relate to a method, wherein the sequence of data points includes data bits or data symbols.

In some aspects, the techniques described herein relate to a method, further including deriving a plurality of round keys from the cryptographic key, wherein each particular round key is associated with a particular layer of the plurality of layers.

In some aspects, the techniques described herein relate to a method, wherein the key application transformation of a particular layer among the plurality of layers includes manipulating a sign of each data point within the at least one data block based on at least one round key bit of the associated round key.

In some aspects, the techniques described herein relate to a method, further including expanding each data point in the at least one data block into a corresponding real component and a corresponding imaginary component, wherein manipulating the sign of each data point in the at least one data block includes manipulating a sign of the corresponding real component and a sign of the corresponding imaginary component separately based on respective round key bits of the associated round key.

In some aspects, the techniques described herein relate to a method, wherein the automorphism of a particular layer includes a plurality of primitive transformations based on a plurality of matrices.

In some aspects, the techniques described herein relate to a method, wherein the plurality of matrices includes matrices of different ranks.

In some aspects, the techniques described herein relate to a method, wherein a first plurality of primitive transformations of a first layer among the plurality of layers is different than a second plurality of primitive transformations of a second layer among the plurality of layers.

In some aspects, the techniques described herein relate to a method, wherein at least one primitive transformation is repeated in the particular layer.

In some aspects, the techniques described herein relate to a method, wherein each matrix among the plurality of matrices is defined by a corresponding complex value pair.

In some aspects, the techniques described herein relate to a method, wherein each matrix is a unitary matrix defined by $$U(\alpha, \beta) = \frac{1}{\sqrt{2}}\begin{pmatrix} e^{i2\pi\alpha} & e^{i2\pi\beta} \\ -e^{-i2\pi\beta} & e^{-i2\pi\alpha} \end{pmatrix},$$

where $e^{i2\pi\alpha}$ and $e^{i2\pi\beta}$ form the corresponding complex value pair, and $\alpha$ and $\beta$ are real numbers.

In some aspects, the techniques described herein relate to a method, further including generating the corresponding complex value pair for each matrix among the plurality of matrices based on ratios of prime numbers.

In some aspects, the techniques described herein relate to a method, wherein the permutation further includes: obtaining a plurality of input data points from a previous transformation, wherein each input data point among the plurality of input data points is a complex number; expanding the plurality of input data points into a plurality of real components and a plurality of imaginary components; permuting the plurality of real components and the plurality of imaginary components in a walking permutation to generate a plurality of permuted components; and consolidating the plurality of permuted components into a plurality of output data points, wherein each output data point among the plurality of output data points is a complex number.

In some aspects, the techniques described herein relate to a system, including: a transmitter configured to transmit signals; and a processor configured to: obtain a sequence of data points and a cryptographic key; group the sequence of data points into at least one data block of a predetermined length; transform the at least one data block to generate at least one encrypted data block by applying a plurality of layers, wherein each layer among the plurality of layers includes a key application transformation based on the cryptographic key, an automorphism, and a permutation; and provide the at least one encrypted data block to the transmitter.

In some aspects, the techniques described herein relate to a system, wherein the processor is further configured to apply at least one additional layer to the at least one encrypted data block, the at least one additional layer including an additional key application transformation or an additional automorphism.

In some aspects, the techniques described herein relate to a system, wherein the processor is further configured to apply a final key application transformation.

In some aspects, the techniques described herein relate to a system, wherein the processor is further configured to derive a plurality of round keys from the cryptographic key, wherein each particular round key is associated with a particular layer of the plurality of layers.

In some aspects, the techniques described herein relate to one or more non-transitory computer readable storage media encoded with software including computer executable instructions and, when the software is executed on a processor of a computing device, operable to cause the processor to: obtain a sequence of data points and a cryptographic key; group the sequence of data points into at least one data block of a predetermined length; transform the at least one data block to generate at least one encrypted data block by applying a plurality of layers, wherein each layer among the plurality of layers includes a key application transformation based on the cryptographic key, an automorphism, and a permutation; and provide the at least one encrypted data block to a transmitter.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The invention claimed is:

1. A method, comprising:

obtaining a sequence of data points and a cryptographic key at a processor;

grouping the sequence of data points into at least one data block of a predetermined length;

transforming the at least one data block to generate at least one encrypted data block by applying a plurality of layers, wherein each layer among the plurality of layers includes a key application transformation based on the cryptographic key, an automorphism, and a permutation; and providing the at least one encrypted data block to a transmitter.

2. The method of claim 1, further comprising applying at least one additional layer to the at least one encrypted data block, the at least one additional layer including an additional key application transformation or an additional automorphism.

3. The method of claim 2, further comprising applying a final key application transformation after the at least one additional layer.

4. The method of claim 1, wherein the sequence of data points includes data bits or data symbols.

5. The method of claim 1, further comprising deriving a plurality of round keys from the cryptographic key, wherein each particular round key is associated with a particular layer of the plurality of layers.

6. The method of claim 5, wherein the key application transformation of a particular layer among the plurality of layers comprises manipulating a sign of each data point within the at least one data block based on at least one round key bit of the associated round key.

7. The method of claim 6, further comprising expanding each data point in the at least one data block into a corresponding real component and a corresponding imaginary component, wherein manipulating the sign of each data point in the at least one data block comprises manipulating a sign of the corresponding real component and a sign of the corresponding imaginary component separately based on respective round key bits of the associated round key.

8. The method of claim 1, wherein the automorphism of a particular layer includes a plurality of primitive transformations based on a plurality of matrices.

9. The method of claim 8, wherein the plurality of matrices includes matrices of different ranks.

10. The method of claim 8, wherein a first plurality of primitive transformations of a first layer among the plurality of layers is different than a second plurality of primitive transformations of a second layer among the plurality of layers.

11. The method of claim 8, wherein at least one primitive transformation is repeated in the particular layer.

12. The method of claim 8, wherein each matrix among the plurality of matrices is defined by a corresponding complex value pair.

13. The method of claim 12, wherein each matrix $U(\alpha, \beta)$ is a unitary matrix defined by $$U(\alpha, \beta) = \frac{1}{\sqrt{2}}\begin{pmatrix} e^{i2\pi\alpha} & e^{i2\pi\beta} \\ -e^{-i2\pi\beta} & e^{-i2\pi\alpha} \end{pmatrix},$$

where $e^{i2\pi\alpha}$ and $e^{i2\pi\beta}$ form the corresponding complex value pair, and $\alpha$ and $\beta$ are real numbers.

14. The method of claim 13, further comprising generating the corresponding complex value pair for each matrix among the plurality of matrices based on ratios of prime numbers.

15. The method of claim 1, wherein the permutation further comprises:

obtaining a plurality of input data points from a previous transformation, wherein each input data point among the plurality of input data points is a complex number;

expanding the plurality of input data points into a plurality of real components and a plurality of imaginary components;

permuting the plurality of real components and the plurality of imaginary components in a walking permutation to generate a plurality of permuted components; and consolidating the plurality of permuted components into a plurality of output data points, wherein each output data point among the plurality of output data points is a complex number.

16. A system, comprising:

a transmitter configured to transmit signals; and a processor configured to:

obtain a sequence of data points and a cryptographic key;

group the sequence of data points into at least one data block of a predetermined length;

transform the at least one data block to generate at least one encrypted data block by applying a plurality of layers, wherein each layer among the plurality of layers includes a key application transformation based on the cryptographic key, an automorphism, and a permutation; and provide the at least one encrypted data block to the transmitter.

17. The system of claim 16, wherein the processor is further configured to apply at least one additional layer to the at least one encrypted data block, the at least one additional layer including an additional key application transformation or an additional automorphism.

18. The system of claim 17, wherein the processor is further configured to apply a final key application transformation.

19. The system of claim 16, wherein the processor is further configured to derive a plurality of round keys from the cryptographic key, wherein each particular round key is associated with a particular layer of the plurality of layers.

20. One or more non-transitory computer readable storage media encoded with software comprising computer executable instructions and, when the software is executed on a processor of a computing device, operable to cause the processor to:

obtain a sequence of data points and a cryptographic key;

group the sequence of data points into at least one data block of a predetermined length;

transform the at least one data block to generate at least one encrypted data block by applying a plurality of layers, wherein each layer among the plurality of layers includes a key application transformation based on the cryptographic key, an automorphism, and a permutation; and provide the at least one encrypted data block to a transmitter.

* * * * *